United States Patent
Hsieh et al.

(10) Patent No.: US 9,758,407 B2
(45) Date of Patent: Sep. 12, 2017

(54) RECYCLING ACTIVATED SLUDGE BY HYDRODYNAMIC SEPERATOR (HDS) TO ENABLE HIGH MLSS BIOREACTOR TO PROCESS HIGH INFLUENT FLOW AND/OR HIGH STRENGTH WASTEWATER

(71) Applicant: Palo Alto Research Center Incorporated, Palo Alto, CA (US)

(72) Inventors: Huangpin B. Hsieh, Palo Alto, CA (US); Francisco E. Torres, San Jose, CA (US); Cory D. Lancaster, Berkeley, CA (US); Armin R. Volkel, Mountain View, CA (US); Ashutosh Kole, San Francisco, CA (US); Kai Melde, Stuttgart (DE)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 631 days.

(21) Appl. No.: 14/136,461

(22) Filed: Dec. 20, 2013

(65) Prior Publication Data
US 2015/0175454 A1     Jun. 25, 2015

(51) Int. Cl.
*C02F 3/02* (2006.01)
*C02F 9/00* (2006.01)
(Continued)

(52) U.S. Cl.
CPC ............. *C02F 3/1221* (2013.01); *C02F 3/12* (2013.01); *C02F 1/38* (2013.01); *C02F 2203/00* (2013.01);
(Continued)

(58) Field of Classification Search
CPC ...... C02F 9/00; C02F 1/38; C02F 3/12; C02F 3/1221; C02F 2209/10; C02F 2001/007;
(Continued)

(56) References Cited

U.S. PATENT DOCUMENTS 4,090,523 A * 5/1978 Kelly, Jr. ............... E21B 21/08
                                                                134/18
8,268,169 B2     9/2012 Lean et al.
(Continued)

OTHER PUBLICATIONS

Lee, "Environmental Engineering Dictionary 4th Edition," 2005, The Scarecrow Press, Inc, p. 501.*
(Continued)

*Primary Examiner* — Claire Norris
(74) *Attorney, Agent, or Firm* — Fay Sharpe LLP

(57) ABSTRACT

A wastewater treatment plant that employs an activated sludge process and a method of operating the same is described. Wastewater influent is provided to a bioreactor configured to perform activated sludge processing to develop mixed liquor suspended solids (MLSS). The MLSS is passed from the bioreactor to a hydrodynamic separator (HDS) system, where separation operations are performed on the MLSS. The separation operations generate a low concentration MLSS stream and a high concentration MLSS stream. The low concentration MLSS stream is passed from the hydrodynamic separator system via a first output to a clarifier, and the high concentration wastewater stream is passed via a second output back to the bioreactor. The clarifier performs clarification operations on the cleaned wastewater stream and then outputs an effluent flow.

18 Claims, 20 Drawing Sheets

(51) Int. Cl.
*C02F 1/40* (2006.01)
*B01D 21/26* (2006.01)
*C02F 3/12* (2006.01)
*C02F 1/38* (2006.01)

(52) U.S. Cl.
CPC ...... *C02F 2209/10* (2013.01); *C02F 2209/40* (2013.01); *Y02W 10/15* (2015.05)

(58) Field of Classification Search
CPC .. C02F 2301/026; C02F 3/02; C02F 2203/00; C02F 2209/40; B01D 21/26; B01D 21/265; B01D 21/267; B04C 2009/005; E03F 5/101; Y02W 10/15
USPC ......... 210/512.1, 195.3, 258, 304, 322, 513, 210/787, 625
See application file for complete search history.

(56) References Cited

U.S. PATENT DOCUMENTS

| | | | |
|---|---|---|---|
| 8,518,235 B2 | 8/2013 | Volkel et al. | |
| 2007/0209999 A1* | 9/2007 | Smith | C02F 1/283 210/631 |
| 2008/0128331 A1 | 6/2008 | Lean et al. | |
| 2008/0230458 A1 | 9/2008 | Lean et al. | |
| 2009/0050538 A1 | 2/2009 | Lean et al. | |
| 2009/0107924 A1* | 4/2009 | Kigel | C02F 3/12 210/758 |
| 2009/0114601 A1 | 5/2009 | Lean et al. | |
| 2009/0114607 A1 | 5/2009 | Lean et al. | |
| 2009/0283452 A1 | 11/2009 | Lean et al. | |
| 2009/0283455 A1 | 11/2009 | Lean et al. | |
| 2010/0072142 A1 | 3/2010 | Lean et al. | |
| 2010/0140092 A1 | 6/2010 | Volkel et al. | |
| 2010/0314263 A1 | 12/2010 | Lean et al. | |
| 2010/0314323 A1 | 12/2010 | Lean et al. | |
| 2010/0314325 A1 | 12/2010 | Lean et al. | |
| 2010/0314327 A1 | 12/2010 | Lean et al. | |
| 2010/0326906 A1* | 12/2010 | Barnes | C02F 3/006 210/614 |
| 2011/0108491 A1 | 5/2011 | Lean et al. | |
| 2012/0145647 A1 | 6/2012 | Volkel et al. | |
| 2012/0152814 A1* | 6/2012 | Lean | C02F 1/385 210/202 |
| 2012/0152855 A1 | 6/2012 | Lean et al. | |
| 2014/0197113 A1 | 7/2014 | Volkel et al. | |

OTHER PUBLICATIONS

U.S. Appl. No. 13/740,752, filed Jan. 14, 2013, entitled "Systems and Apparatus for Removal of Harmful Algae Blooms (HAB) and Transparent Exopolymer Particles (TEP)" by Volkel et al.

Report: "Cost benefit study of the impacts of potential nutrient controls for Colorado Point Source Discharges", Jan. 2012, Section 1-Section 8, CDM Smith (uploaded to EFS in five parts).

Smollen, M., and Ekama, G., Comparison of Empirical Settling-Velocity Equations in Flux Theory for Secondary Settling Tanks, *Water South Africa,* vol. 10, No. 4, Oct. 1984, p. 175-184.

Pincince, A.B., Braley, B.G., Sangrey, K.H., and Reardon, R.D., "Minimizing costs of activated sludge systems," *Water Environment Research,* vol. 69, No. 3, (1997) pp. 326-330.

* cited by examiner

| UNIT | INPUT TSS | EFFLUENT TSS | CONCENTRATE TSS | INPUT FLOW RATE, LPM | EFFLUENT FLOW RATE, LPM | CONCENTRATE FLOW RATE, LPM |
|---|---|---|---|---|---|---|
| 1 | 3000.0 | 407.1 | 5592.9 | 300 | 150 | 150 |
| 2 | 325.9 | 44.2 | 607.6 | 200 | 100 | 100 |
| 3 | 607.6 | 82.5 | 1132.8 | 100 | 50 | 50 |

CHANNEL MULTIPLIER 3.0
RECYCLE FLOW 200.0
RECYCLE TSS 4478

SEPARATOR CONFIGURATION

1 MODULE = 40,0000 gpd

1 TOWER = 240,000 gpd

1 UNIT = 1 mgd

RECYCLING ACTIVATED SLUDGE BY HYDRODYNAMIC SEPERATOR (HDS) TO ENABLE HIGH MLSS BIOREACTOR TO PROCESS HIGH INFLUENT FLOW AND/OR HIGH STRENGTH WASTEWATER

BACKGROUND

Many wastewater treatment plants (WWTPs) utilize an activated sludge process (ASP—primarily consisting of suspended growth biological treatment reactors and secondary clarifiers) designed to operate at mixed liquor suspended solids (MLSS) concentrations of approximately 3,000 mg/L or lower. MLSS is the suspended biomass that grows on the contaminants in wastewater as the contaminants are degraded. It is considered however that it becomes cost prohibitive to operate an ASP process at substantially higher MLSS concentrations, such as approximately in the range of 5,000 mg/L to 6,000 mg/L or higher. On the other hand while the newer membrane bioreactor (MBR) approach, in which solid-liquid separation is accomplished by micro- or ultra-filtration membranes, can cost effectively process higher MLSS concentrations, it is also understood implementing MBR becomes cost prohibitive in the range of approximately 5,000 mg/L to 6,000 mg/L, and below.

Aeration is not a limiting factor to operating ASPs at the higher MLSS levels since mechanical or fine bubble diffused aeration is still cost effective at MLSS concentrations upward of 10,000 mg/L. However, a factor that does inhibit use of ASP at these higher MLSS concentration levels is the capital cost of secondary clarifiers, which increases non-linearly as the MLSS concentration approaches and exceeds 5,000 mg/L.

Therefore it is considered useful to provide systems and methods that increase the operational capacity of existing WWTPs using ASP approaches in a cost effective manner.

INCORPORATION BY REFERENCE

The following articles, and co-pending and commonly assigned applications, the disclosures of each being totally incorporated herein by reference, are mentioned:

U.S. Published Application Publication No. 2009/0050538, entitled, "Serpentine Structures for Continuous Flow Particle Separations", by Lean et al.; U.S. Published Application Publication No. 2008/0128331, entitled, "Particle Separation and Concentration System", by Lean et al.; U.S. Published Application Publication No. 2008/0230458, entitled, "Vortex Structure for High Throughput Continuous Flow Separation", by Lean et al.; U.S. Published Application Publication No. 2009/0114601, entitled, "Device and Method for Dynamic Processing in Water Purification", by Lean et al.; U.S. Published Application Publication No. 2009/0114607, entitled, "Fluidic Device and Method for Separation of Neutrally Buoyant Particles", by Lean et al.; U.S. Published Application Publication No. 2010/0140092, entitled, "Flow De-Ionization Using Independently Controlled Voltages", by Armin R. Volkel et al.; U.S. Patent Application Publication No. 2010/0314323, entitled, "Method and Apparatus for Continuous Flow Membrane-Less Algae Dewatering", by Lean et al.; U.S. Published Application Publication No. 2009/0283455, entitled, "Fluidic Structures for Membraneless Particle Separation", by Lean et al.; U.S. Published Application Publication No. 2009/0283452, entitled "Method and Apparatus for Splitting Fluid Flow in a Membraneless Particle Separation System", by Lean et al.; U.S. Patent Application Publication No. 2011/0108491, entitled, "Desalination Using Supercritical Water and Spiral Separation", by Lean et al.; U.S. Published Application Publication No. 2010/0072142, entitled, "Method and System for Seeding with Mature Floc to Accelerate Aggregation in a Water Treatment Process", by Lean et al.; U.S. Patent Application Publication No. 2010/0314263, entitled, "Stand-Alone Integrated Water Treatment System for Distributed Water Supply to Small Communities", by Lean et al.; U.S. Patent Application Publication No. 2010/0314325, entitled, "Spiral Mixer for Floc Conditioning", by Lean et al.; U.S. Patent Application Publication No. 2010/0314327, entitled, "Platform Technology for Industrial Separations", by Lean et al.; U.S. Patent Application Publication No. 2012/0145647, entitled, "Electrocoagulation System", by Volkel et al.; U.S. Pat. No. 8,518,235, entitled, "All-Electric Coagulant Generation System", by Volkel et al.; U.S. Pat. No. 8,268,169, entitled, "Membrane Bioreactor (MBR) And Moving Bed Bioreactor (MBBR) Configurations For Wastewater Treatment", by Meng H. Lean et al.; U.S. Patent Application Publication No. 2012/0152855, entitled "System and Apparatus for Seawater Organics Removal", by Lean et al.; U.S. patent application Ser. No. 13/740,752, entitled "Systems And Apparatus For Removal Of Harmful Algae Blooms (HAB) And Transparent Exopolymer Particles (TEP)" by Volkel et al.; Report: "Cost benefit study of the impacts of potential nutrient controls for Colorado Point Source Discharges", January 2012, Section 1-Section 8, CDM Smith; Smollen, M., and Ekama, G., Comparison of Empirical Settling-Velocity Equations in Flux Theory for Secondary Settling Tanks", *Water South Africa*, Vol. 10, No. 4, October, 1984, p 175-184; and Pincince, A. B., Braley, B. G., Sangrey, K. H., and Reardon, R. D., "Minimizing costs of activated sludge systems," *Water Environment Research*, Volume 69, Number 3, (1997) Pages 326-330.

BRIEF DESCRIPTION

A wastewater treatment plant that employs an activated sludge process and a method of operating the same is described. Wastewater influent is provided to an activated sludge bioreactor where soluble and particulate organic matter is converted to biomass and/or incorporated within MLSS. Following treatment, the MLSS is passed from the bioreactor to a hydrodynamic separator (HDS) system, where MLSS separation operations are performed. The HDS separation operations generate a low MLSS concentration stream and a high MLSS concentration stream. The low MLSS concentration stream is passed from the hydrodynamic separator system via a first output to a clarifier, and the high MLSS concentration stream is passed via a second output back to the bioreactor. The clarifier performs final MLSS separation operations and then discharges a treated effluent. A small quantity of thickened MLSS may be periodically wasted to control the inventory of solids in the system.

DETAILED DESCRIPTION

An activated sludge process (ASP) is a known procedure for treating wastewater in bioreactors using aeration and mixed liquor suspended solids (MLSS). MLSS is comprised of biological flocs ("biomass") composed mainly of bacteria and protozoa, and enmeshed particulate organic matter in various stages of degradation. This MLSS is the "activated sludge" for which the process is named. A factor which has previously foreclosed the use of ASPs at higher MLSS concentrations is the cost of clarification, which has been found to increase non-linearly once MLSS concentrations rise beyond a typical ASP operational MLSS set-point. In fact, conventional ASP facilities are designed to accommodate this limitation. In embodiments of this application systems and methods are disclosed which lower the total bioreactor and/or clarification requirement (and subsequent capital cost) by using Hydrodynamic Separator (HDS) systems between bioreactors and clarifiers of ASPs.

In certain embodiments described below HDS systems are used to retrofit existing treatment plants thereby increasing treatment capacity (increasing the flow and/or strength of an influent wastewater), where the existing bioreactor/clarifier arrangements are maintained. In other embodiments the HDS systems are included in new treatment plants to allow the use of a smaller bioreactor than would otherwise be needed, and/or a smaller clarifier than would otherwise be needed, and/or the elimination of the clarifier altogether.

Figure 1:
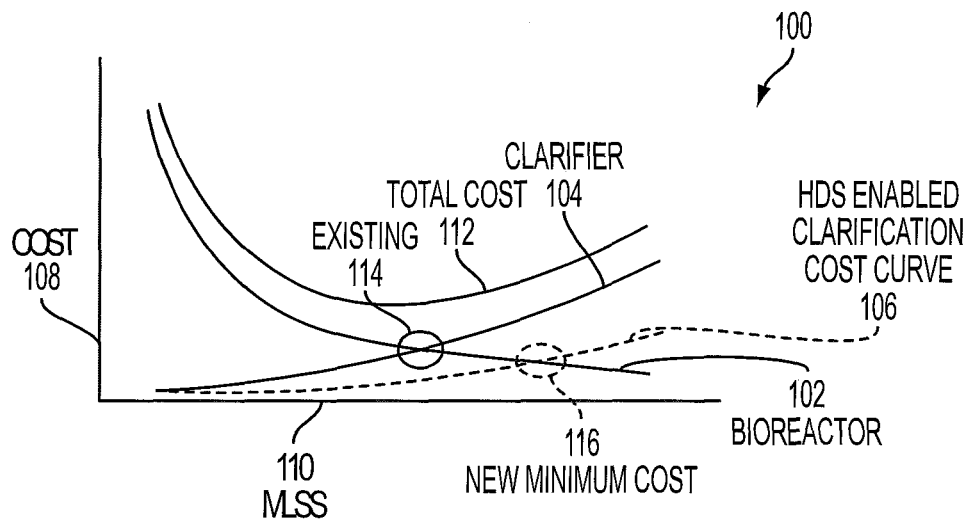
FIG. 1 is a graph depicting various bioreactor and clarification cost curves.

Graph 100 of FIG. 1 includes a bioreactor curve 102 and clarification cost curves 104 and 106, where these curves are defined based on costs (increasing along the vertical axis from bottom to top) 108 and MLSS concentrations (increasing along the horizontal axis from left to right) 110. The first clarification curve 104 represents costs for existing clarification technology and the second clarification curve 106 depicts clarification costs obtainable by employing the concepts of the present application. A total cost curve 112 represents a total cost for a water treatment plant using conventional ASP and strikes a balance between clarifier and bioreactor sizes. It is noted that certain content of graph 100 (i.e., costs curves related to existing technology, and in particular WWTPs using known ASP processes) is derived from the work of Dr. Al Pincince of CDM Smith in Cambridge, Mass. (Pincince, A. B., Braley, B. G., Sangrey, K. H., and Reardon, R. D., "Minimizing costs of activated sludge systems", *Water Environment Research*, Volume 69, Number 3 (1997) Pages 326-330, hereby incorporated by reference in its entirety.

To treat influent wastewater with a fixed amount of activated sludge (i.e., biomass inventory), it is possible to design an ASP to operate at various MLSS concentrations. At a higher MLSS concentration, the bioreactor can be smaller and therefore the cost of bioreactor construction is lower. However, with increasing MLSS concentration (as a result of a constant biomass inventory in a smaller bioreactor volume), the size of the required clarifier rapidly increases, therefore rapidly increasing capital cost for clarifiers.

As shown in FIG. 1, in wastewater treatment plants (WWTPs) using existing technology the lowest cost is where the sum of the two curves (cost of bioreactor and cost of clarification) reaches a minimum 114, and the MLSS concentration at that point is optimal from a cost perspective. Therefore using graph 100 it can be understood that it is desirable to enable a clarification cost curve that does not rise as rapidly as MLSS concentration increases. Such a curve is shown as the HDS enabled clarification cost curve 106. With the lowered clarification cost curve 106, the new optimal cost point 116 is moved lower (i.e., decreased cost) and to the right (i.e., higher MLSS) of minimum point 114. Both have positive implications.

In order to better understand the significance of the lowered clarification cost curve 106, the present application now describes modeling simulations used to obtain actual model based bioreactor volume and clarifier surface area values. The modeling employs a professional wastewater simulation software package (BioWin from EnviroSim Associates LTD).

Figure 2:
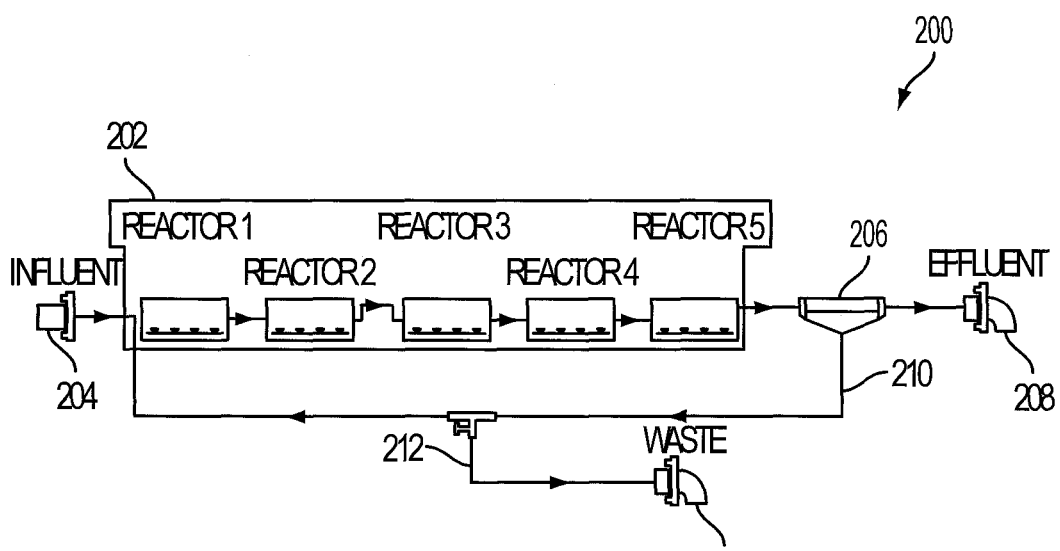
FIG. 2 depicts a modeled wastewater treatment plant used for simulation of water flow processing.

FIG. 2 depicts a modeled WWTP 200 employing a typical plug flow reactor (PFR) 202, which is simulated by BioWin through the use of five stirred tank reactors (CSTR) in series (i.e., REACTOR1-REACTOR5), configured to receive INFLUENT via an input 204. A clarifier 206 receives an output from the PFR 202, where MLSS separation is undertaken to produce an EFFLUENT fluid provided to output 208. In addition a portion of the MLSS in the clarifier 206 is passed through a reflow or recycle line 210 back to an input of the PFR 202, while another portion of the wastewater is output as a waste stream via waste output line 212 to waste output 214.

Using the BioWin simulations as an example, and in consideration of various governmental requirements for effluent quality, certain treatment targets are provided for the wastewater to be treated. For the present example the Average Daily Flow (ADF) will be 25 million gallons a day (mgd). For 130 mg/L influent Basic Oxygen Demand (BOD) the goal is to have less than 10 mg/L effluent BOD, and for 130 mg/L influent Total Suspended Solids (TSS) the goal is to have less than 10 mg/L effluent TSS. The above mentioned values being used as influent to a secondary process.

It is to be understood the above is used as example values and in other settings, different values may be more appropriate.

Figure 3:
FIG. 3 is a chart listing results of operation of the simulated wastewater treatment plant of FIG. 2.

Turning to FIG. 3, chart 300 provides results for a number of simulated runs using the BioWin WTTP simulation design 200. The left-side column includes a RUNS row (i.e., runs 1-14), as well as reaction conditions and design parameters (i.e., Solids Residence Time in days (SRT), REACTOR VOLUME (i.e., bioreactor volume), Temperature (TEMP, C), and Dissolved Oxygen (DO). These conditions and parameters are applied for wastewater having varying operating MLSS concentrations (last row). Also included in the left side column are certain elements of interest in the corresponding effluent including, EFFLUENT NH4-N; EFFLUENT sCOD (soluble Chemical Oxygen Demand); EFFLUENT NO3-N; and EFFLUENT sBOD (soluble Biochemical Oxygen Demand).

A requirement that nitrification of the wastewater be achieved is included in the BioWin simulations since many WWTPs are required to remove ammonia from effluent. The nitrification requirement increases Solids Residence Time (SRT) significantly, so SRT was reviewed from 1.5 days for BOD removal only to 12 days for Bod removal and complete nitrification that converts the majority of ammonia (NH4-N) to nitrate (NO3-N). The assumptions and graphical representations depicted in FIG. 3 include a base case, and more extensive simulation iterations for different SRT and bioreactor volumes.

To review chart 300, it is shown that in a first simulation run ("RUN 1"), the bioreactor volume was set at 20,000 m$^3$, the temperature at 10 C, dissolved oxygen was fixed at 2 mg/L, and the SRT was selected to be 12 days. These conditions and design parameters are variously altered in runs 2-14 to identify the MLSS concentrations that can meet some or all of the target specifications in a resulting effluent.

It is noted that in the simulations, at a SRT of three (3) days or shorter, a significant amount of NH4-N remains (>5 mg/L) in the effluent and is not likely to meet permit requirements in many parts of the world. In certain simulations a fixed SRT of 12 days was selected to study the MLSS concentrations vs. bioreactor sizes. Bioreactor size (i.e., Bioreactor Volume) is inversely proportional to the MLSS concentration as approximately summarized in the following Bioreactor Cost And Size vs. MLSS Table:

| MLSS (mg/L) | Bioreactor Volume (m$^3$) | SRT (days) | Depth (m) | Bioreactor SA (m$^2$) | Cost Including Aeration ($M) |
| --- | --- | --- | --- | --- | --- |
| 2500 | 50,000 | 12 | 6 | 8333 | $68 |
| 3200 | 40,000 | 12 | 6 | 6667 | $56 |
| 4200 | 30,000 | 12 | 6 | 5000 | $43 |
| 6300 | 20,000 | 12 | 6 | 3333 | $31 |
| 8400 | 15,000 | 12 | 6 | 2500 | $25 |

Below is a table showing approximate secondary clarifier sizes versus MLSS concentrations (this table has the same MLSS concentrations as in the Bioreactor Cost And Size vs. MLSS Table above) and shows that clarifier costs increase as MLSS increases. The table provides clarifier surface area estimations under two scenarios: (i) having a fixed "Return Ratio" of 0.63 or a (ii) "best" Return ratio possible:

| MLSS (mg/L) | Clarifier SA for R-0.63 (m$^2$) | Cost for R = 0.63 | Clarifier SA for Highest Feasible Input Flow, m$^2$ | Corresponding 'best' R | Cost for 'best' R ($M) |
| --- | --- | --- | --- | --- | --- |
| 2500 | 3700 | $10M | 3600 | 0.31 | $10M |
| 3200 | 4800 | $13M | 4600 | 0.45 | $13M |
| 4200 | 7900 | $22M | 7000 | 0.73 | $19M |
| 6300 | 41000 | $113M | 16000 | 1.18 | $45M |
| 8400 | 260000 | $718M | 39000 | 1.99 | $108M |

Costs are +50%/−30%
SA=surface area
At constant SRT, reactor volume is inversely proportional to MLSS
Assumptions: SVI=150, Design flow=Maximum daily flow*1.3 safety factor, Maximum daily flow=1.6 ADF
Clarifiers sized according to solids flux calculations commonly used in the industry (see below)
R=Return ratio=underflow return rate/output flow rate In order to minimize the surface area of a clarifier as MLSS concentrations increase, the return ratio needs to increase (i.e. recycling more MLSS back to the bioreactor). The impact of high return ratio on the operational cost is significant as pumping energy cost increases significantly. Even so, in this example using a high-level estimate based on cost per surface area, at high MLSS concentrations (6300 and 8400 mg/L in the table above), the cost of clarifiers ($45 m & $108 M) far exceed that of bioreactors ($31 M & $25 M, see previous table "Bioreactor Cost And Size vs. MLSS" above), even with "Best" Return Ratio, indicating an operational regime that is not cost-effective in the conventional activated sludge process (ASP). This is a reason WWTPs which implement a conventional suspended activated sludge process (ASP) are not understood in the art to be designed to operate above approximately 3,000 mg/l to 3,500 mg/L: i.e., the cost of clarification with a conventional gravity-driven clarifier is prohibitive.

In this discussion the simulated costs for bioreactors with aeration and clarifiers were developed based on a high level cost estimate for a collection of plants of a certain size in the state of Colorado (Report: "Cost benefit study of the impacts of potential nutrient controls for Colorado Point Source Discharges", CDM Smith, January 2012, Section 1-Section 8), hereby incorporated by reference in its entirety, and costs for each process from that high level estimate were broken down to a cost per surface area basis. Thus the discussed values should not be considered a detailed cost estimate (based on the BioWin simulations), but rather they are used to provide a general understanding of the cost differentials involved.

In the simulation, a "best clarifier" was assumed. The term "best clarifier" being understood herein to mean the minimum return ratio that provides the smallest clarifier based on theoretical calculations of solids flux. After the bioreactor sizing versus MLSS concentrations was determined, the surface area (footprint) requirement for clarification was evaluated. Contrary to bioreactor capacity which is proportional to volume, clarifier capacity is based on surface area, and the required surface area for a given MLSS concentration may be evaluated by a set of solids flux curves used to simplify the design process. These curves are based on mathematical formulas such as those presented in Smollen and Ekama, (see "Comparison of empirical settling-velocity equations in flux theory for secondary settling tanks", Smollen, M., and Ekama, G. *Water South Africa*, Vol. 10, No. 4, October, 1984, p 175-184), hereby incorporated herein in its entirety.

Solids flux curves based on calculations presented by Smollen and Ekama (1984) are specified by a set of operating conditions—the "overflow rate" (rate at which flow leaves the clarifier over the weirs at the edge of the clarifier) and "return ratio" (the rate the solids from the bottom of the clarifier (thickened MLSS, or sludge) are removed and returned to the bioreactors in relation to the influent flow) for MLSS with a given concentration and settling properties. The operational goal is to minimize capital cost by designing a bioreactor for enough return sludge to allow maximum overflow rate at a given MLSS concentration. It is noted the capacity of a clarifier is significantly impacted by the ability of the sludge to settle quickly, an empirical property known as sludge volume index (SVI), with units of ml/g. A lower SVI means a smaller clarifier is needed. A typical median SVI is approximately 150 ml/g.

The SVI impacts clarifier surface area requirements at different MLSS concentrations. A high SVI impacts negatively conventional ASP operations that rely on settling for solids separation. On the other hand, configurations with HDS are uniquely suited for high SVI as set out in the present disclosure, as HDS systems are designable to separate MLSS that is neutrally buoyant, regardless of settling properties. Design of an HDS system to separate neutrally buoyant material was initially discussed in U.S. patent application Ser. No. 11/936,729 titled, Fluidic Device And Method For Separation Of Neutrally Buoyant Particles, Lean et al., now U.S. Patent Application Publication 2009/0114607 A1, hereby incorporated by reference in its entirety. Additional discussion of a design will be presented herein.

Figure 4:
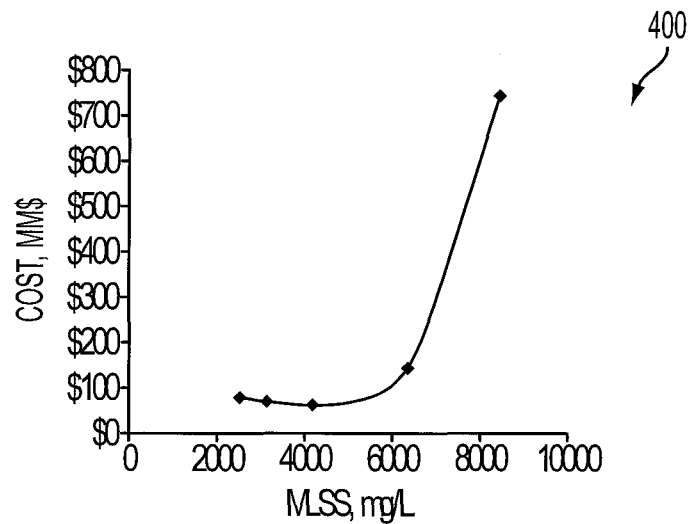
FIG. 4 is a chart of the costs to construct a wastewater treatment plant for increasing values of Mixed Liquor Suspended Solids (MLSS) concentrations.
Figure 5:
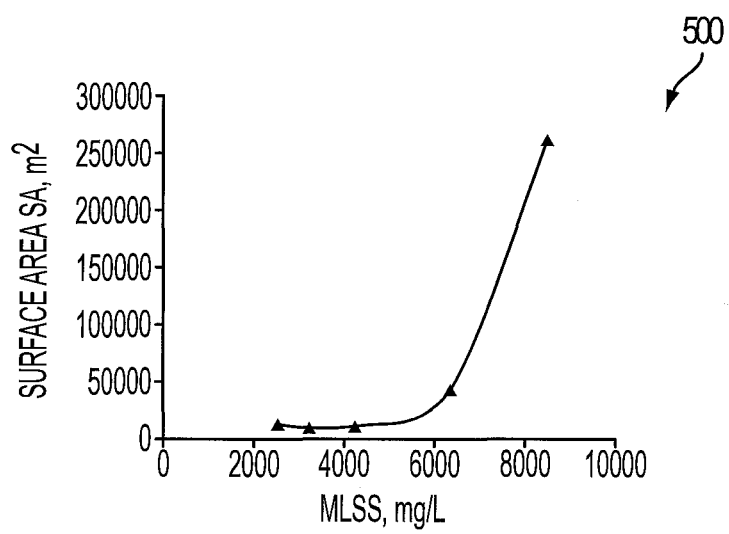
FIG. 5 is a chart showing required clarifier surface area for increasing levels of MLSS.

Summarizing the foregoing, attention is directed to cost curve 400 of FIG. 4 and surface area (SA) curve 500 of FIG. 5 for combined bioreactor and clarifier in these simulated conventional activated sludge processes (ASP) (having in this example an assumed SVI of 150 ml/g). As seen from FIGS. 4 and 5 the total cost of a bioreactor and clarifier, as well as their combined footprint, starts to increase dramatically around 5000 mg/L and exponentially above MLSS concentrations of 6000 mg/L. It is to be understood in the illustrated curves bioreactor costs at higher MLSS do not include aeration costs. It should be noted that aeration costs do increase slightly with increasing MLSS concentration, because oxygen transfer efficiency decreases with increasing concentration. However, these costs are negligible.

The estimated capital costs for the five (5) simulated MLSS concentrations are tabulated below, in the following Combined Cost And Footprint For Reactor Plus Secondary Clarifier Vs. MLSS chart:

| MLSS (mg/l) | Combined Process SA (m²) | Cost |
| --- | --- | --- |
| 2500 | 12,000 | $78M |
| 3200 | 11,000 | $69M |
| 4200 | 13,000 | $65M |
| 6300 | 44,000 | $144M |
| 8400 | 263,000 | $743M |

The lessons learned from the example modeling simulations are two-fold. First, conventional activated sludge processes (ASP) have been designed to operate at an optimal MLSS concentration that is far below what is possible of a bioreactor due to the limitations of conventional clarification processes. Second, in order to increase the efficiency of ASP in an economically viable way, an alternative and more efficient solid-liquid separation technology to recycle biomass is needed to enable bioreactors to operate at higher MLSS concentrations.

There is no easy way to decouple the biomass recycling from clarification, the two functions performed by a conventional clarifier. It is, however, possible to separate these two functions by using an additional step, such as HDS-enabled technology, that is suitable for recycling the bulk of the biomass from liquid and leaving the influent to the clarifier with a much reduced solids concentration in the liquid stream. These concepts and novel ways of using HDS technology in the ASP process are exemplified by embodiments detailed below.

Figure 6:
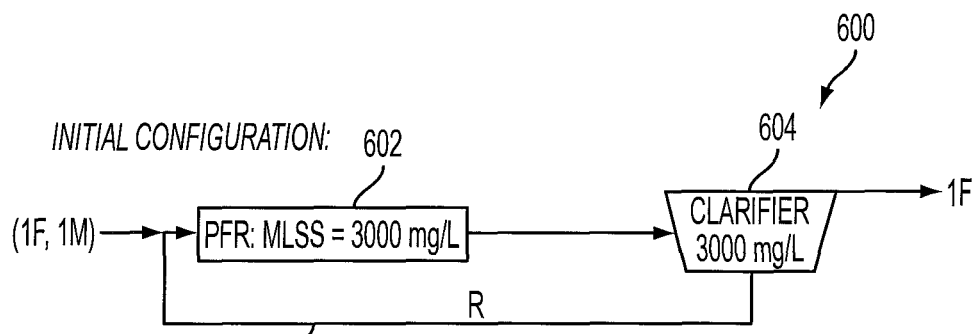
FIG. 6 depicts a configuration for an existing wastewater treatment plant.
Figure 7:
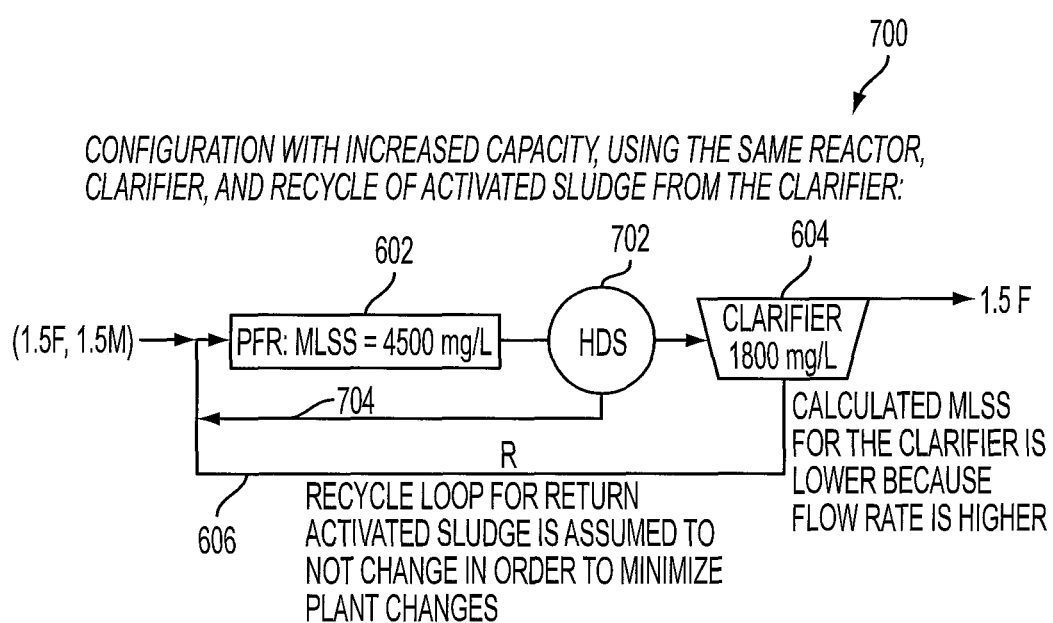
FIG. 7 depicts a configuration of the wastewater treatment plant of FIG. 6, expanded for increased capacity in accordance with one aspect of the present application.

Turning to FIGS. 6 and 7 concepts of the present application are illustrated. FIG. 6 is intended to represent a configuration of an existing Wastewater Treatment Plant (WWTP) 600 having an ASP capable bioreactor 602, and a clarifier 604 configured to have a capacity of 3,000 mg/L MLSS. A reflow or recycle line (R) 606 is shown going back to the bioreactor 602. The flow rate of the WWTP is identified as being 1F, while the mass loading rate of the WWTP is identified as being 1M.

It is assumed WWTP 600 is an existing ASP plant designed and operated in accordance with those proficient in the art. Further it is understood in the art that it is becoming more common that existing plants need to increase their processing capacity for flow F and load M. This is true in consideration of overall population growth and the increasing urbanization of the world's population. It is further known that substantial issues arise when such expansions are attempted to be undertaken. These issues include the lack of available land for plant expansion, and the cost of such expansions using existing technology, i.e., adding parallel treatment trains (bioreactors and clarifiers). However, instead of adding new treatment trains the concepts of the present application provide expansion options which implement HDS as a sludge recycling mechanism to enable an existing bioreactor and clarification facility to handle additional influent flow and/or higher influent concentrations without new parallel treatment trains.

In an example embodiment shown in FIG. 7, the capacity-increased WWTP design 700 includes an HDS system 702 to enable a plant flow and load capacity to be increased up to 50%, i.e., the flow (F) being increased to 1.5F from the 1F, and with the influent load (mass (M)) being increased to 1.5M from 1M (flow and load being proportional for wastewaters of a typical concentration). In such a situation, one of ordinary skill in the art may use known solids flux curves and/or known design equations, which consider both flow and mass loading to determine that the clarifier 604 has the capacity to handle a MLSS concentration up to 1800 mg/L at that higher flow.

In the capacity-increased WTTP design 700, the HDS system 702 is interposed between the bioreactor 602 and the clarifier 604, where the HDS system 702 has a reflow- or recycle-line 704 back to the bioreactor 602. Use of the HDS system 702 with reflow or recycle line 704 allows the bioreactor 602 in this example capacity expansion arrangement to operate at 50% higher concentration or 4,500 mg/L MLSS, with an increase flow rate of 1.5F and increase of mass loading of 1.5M, and allow a capacity of the clarifier to be approximately 1800 mg/L.

More particularly, in FIG. 7, wastewater influent is provided to bioreactor 602 where mixed liquor suspended solids (MLSS) are developed, i.e., wastewater is provided to activated sludge bioreactor 602 where soluble and particulate organic matter is converted to biomass and/or incorporated into MLSS. From there the MLSS is provided to HDS system 702, where separation operations are performed to generate a low concentration MLSS stream and a high concentration MLSS stream. The low MLSS concentration stream is sent from a first HDS output to the clarifier 604, and the high concentration MLSS stream is sent from a second HDS output to the reflow recycle line 704, and then to bioreactor 602. The low concentration MLSS stream is further processed by the clarifier 604 to generate an effluent flow.

It is understood that in various embodiments the high concentration MLSS stream is from 1% to over 99% or more concentrated than the low concentration MLSS stream, and is preferably from 50% to over 99% or more concentrated. It is also to be understood that in certain embodiments the low concentration MLSS stream may remove a sufficient amount of particles (MLSS floc) such that the low MLSS concentration stream is considered MLSS free (i.e., it would meet governmental standards to be considered a clean effluent, which is often less than 30 mg/L total suspended solids (TSS) for many facilities in the US). It is to be further understood that all of the MLSS from the bioreactor is not necessarily provided to the HDS. Rather, in certain embodiments a portion of the MLSS from the bioreactor could be diverted directly to the clarifier by, for example, providing a line from the bioreactor 602 directly to clarifier 604.

It is to also be appreciated the bioreactor 602 shown in FIG. 7 (as well as bioreactor 802 of FIG. 9) may in certain embodiments represent a bioreactor arrangement that includes more than a single bioreactor, arranged either in series and/or in parallel. Further, in particular embodiments, bioreactor 602 (and 802 of FIG. 9) are designed to handle various MLSS concentrations such, including but not being limited to, from 4500 mg/L or greater, from approximately 5,000 mg/L or greater, as well as approximately 6000 mg/L or greater, or still approximately 5,000 mg/L to approximately 6,000 mg/L.

The described increased operation will require increased aeration due primarily to the 50% increase in mass load requiring treatment. Capacity expansion by use of the HDS system 702 also reduces the footprint of the HDS expanded WWTP, compared to augmenting the existing treatment train by 50% without the use of the HDS system. The following illustrates aspects and assumptions for the example presented for this embodiment:

Basis: 25 mgd Average Daily Flow (ADF) plant capacity expanded by 50%
HDS cost≈$11 M installed & commissioned
HDS footprint≈3400 m² (0.84 acres)
Capacity expanded by 50% for <40% of the cost and footprint that would be needed to expand capacity simply by adding secondary clarifiers and operating the existing reactor at higher MLSS
HDS enables operation of bioreactor at higher MLSS— Because reaction will have higher MLSS and higher BOD load, upgrade of aeration will be needed
Design Assumption: HDS flow is 1.6*ADF*(1+R), R=0.5

It is understood the foregoing arrangement may increase plant capacity by a percentage other than 50% (greater or less) depending upon the particular characteristics of each implementation.

Figure 8:
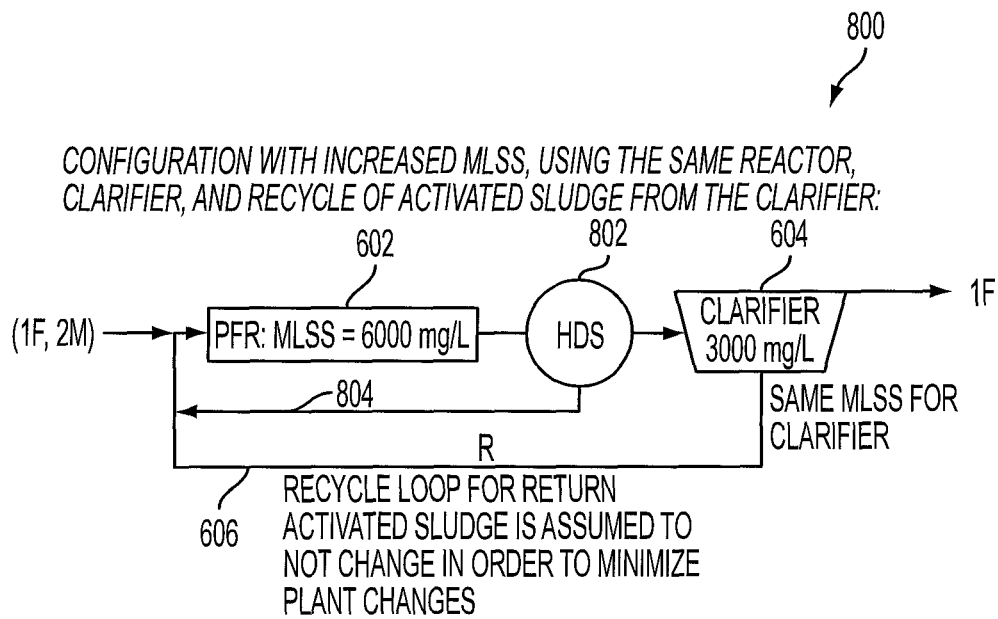
FIG. 8 depicts a configuration of a manner of expanding the wastewater treatment plant of FIG. 8 where plant is capable of processing wastewater with increased strength.

Turning to another embodiment attention is directed to FIG. 8, which considers the impact of higher loads but not flows (hence higher concentrations). It is now mentioned that treatment of industrial wastewater is often very different than municipal wastewater which tends to be more consistent across different areas. Industries often produce high strength wastewater with high biochemical oxygen demand (BOD), chemical oxygen demand (COD), total suspended solids (TSS), or other constituents. These wastewaters, can significantly increases the mass load or other matter that needs to be broken down or removed within the plant. Thus there is often a need to increase capacity of wastewater facilities receiving high strength industrial wastewater, even though the flow (F) is not appreciably higher than for municipal wastewater.

It is considered that a treatment process that accommodates high strength wastewaters requires bioreactors and clarifiers to be larger when compared with normal strength wastewaters with comparable a flow rate simply due to the increase in influent mass loading.

As previously mentioned, FIG. 6 illustrates an existing WWTP design 600 with bioreactor 602 and a clarifier 604, having a capacity of MLSS of 3,000 mg/L at a 1F flow rate and 1M loading rate, with a recycle or reflow line (R) 606 back to the bioreactor 602. This represents an ASP prior to the introduction of high-strength industrial wastewaters.

In FIG. 8, and similar to FIG. 7, an HDS system 802 is interposed between bioreactor 602 and the clarifier 604, with a recycle or reflow line 804 back to the bioreactor 602. Use of the HDS system 802, also generates a low concentration MLSS stream and a high concentration MLSS stream such as discussed in connection with FIG. 7, each of which are processed as also described in connection with FIG. 7.

In this embodiment, the flow rate is 1F, which is the same flow rate as in FIG. 6, but the mass loading rate is 2M. Therefore the HDS system 802 allows the clarifier 604 to be sufficient to handle 3000 mg/L, the same as in FIG. 6, but the bioreactor 602 is operated with MLSS of 6000 mg/L. This arrangement means the existing WWTP (i.e., WWTP 600 of FIG. 6) does not need to adjust its existing clarifier and bioreactor infrastructure or arrangement, and the bioreactor can operate at higher MLSS as the HDS system is used to lower the MLSS that will be seen by the clarifier to the concentrations seen prior to the increase in mass load, even though the system of FIG. 8 is operating at the same fluid flow rate as the non-upgraded system of FIG. 6.

These results illustrate the implementation of Hydrodynamic Separator (HDS) systems enable the above mentioned methods of operating wastewater treatment plants (WWTP) to allow increased influent flow, wastewater load, and/or a combination of both, without expanding the existing bioreactor and/or clarifier sizes.

To provide additional details of the expansion capabilities of a WWTP by use of HDS, the following tables are provided which lists a comparison of implementing HDS to an existing plant ("Base") versus adding clarifiers ("Additional Clarifiers"), undertaking a total plant expansion by copying the existing treatment train ("Expand capacity to treat 1.5F, 1.5M") and/or the load ("Expand capacity to treat 1F and 2M").

Capital Cost & Footprint Comparison

Case #1: Expand Capacity to Treat 1.5F and 1.5M

| Flow rate: | 1F | 1.5F | 1.5F | 1.5F |
|---|---|---|---|---|
| Mass loading rate | 1M | 1.5M | 1.5M | 1.5M |

-continued

| Flow rate: | 1F | 1.5F | 1.5F | 1.5F |
|---|---|---|---|---|
| Case | Base | HDS recycle | Additional Clarifiers | Expand Entire Plant 1.5x |
| Bio reactor | 3000 MLSS | 4500 MLSS | 4500 MLSS | 3000 MLSS |
| Clarifier | 3000 MLSS | 1800 MLSS (same size as 3000 MLSS at flow = 1F) | 4500 MLSS | 3000 MLSS |
| Capital cost ($MM) bio reactor cost: | $66.70 | $70.65 | $70.65 | $100.05 |
| Clarifier cost: | $11.70 | $11.70 | $25.74 | $17.55 |
| HDS cost: | $0.00 | $6.30 | $0.00 | $0.00 |
| Hydraulics: | $2.20 | $3.30 | $3.30 | $3.30 |
| Subtotal: | $80.60 | $91.95 | $99.69 | $120.90 |
| Existing clarifier land (acre) | 1.49 | 1.49 | 1.49 | 1.49 |
| Additional land needed (acre) | 0.41 | | 1.79 | 2.56 |
| Additional capital cost ($MM) | $11.35 | | $19.09 | $40.30 |

Capital Cost & Footprint Comparison

Case #2: Expand Capacity to Treat 1F and 2M

| Flow rate: | 1F | 1F | 1F | 1F |
|---|---|---|---|---|
| Mass loading rate | 1M | 2M | 2M | 2M |
| Case | Base | HDS recycle | Additional Clarifiers | Expand Bioreactor 2x |
| Bioreactor | 3000 MLSS | 6000 MLSS | 4500 MLSS | 3000 MLSS |
| Clarifier | 3000 MLSS | 3000 MLSS | 4500 MLSS | 3000 MLSS |
| Capital cost ($MM) bio reactor cost: | $66.70 | $73.00 | $73.00 | $133.40 |
| Clarifier cost: | $11.70 | $11.70 | $84.24 | $11.70 |
| HDS cost: | $0.00 | $4.20 | $0.00 | $0.00 |
| Hydraulics: | $2.20 | $2.20 | $2.20 | $2.20 |
| Subtotal: | $80.60 | $91.10 | $159.44 | $147.30 |
| Existing clarifier land (acre) | 1.49 | 1.49 | 1.49 | 1.49 |
| Additional land needed (acre) | 0.28 | | 9.24 | 3.34 |
| Additional capital cost ($MM) | $10.40 | | $78.84 | $66.70 |

It is known that high sludge volume index (SVI) will reduce the sedimentation speed of MLSS in the clarifier, so it is considered appropriate to confirm the effluent that HDS outputs to a clarifier has comparable or lower SVI than the wastewater input to the HDS. The tables below include data from experiments which compared the SVI of two concentrate samples and their HDS effluents. In the first sample (MLSS=4,703 mg/L) SVI effectively decreased from 62.7 to 46.5 and in the second sample (MLSS=4,030 mg/L) SVI effectively decreased from 57.8 to 51.2. Therefore, HDS operation is considered to not negatively impact the sedimentation property of the activated sludge.

| Samples | TSS (mg/L) | Volume of solids after 30 min in 1 L graduated cylinder (mL/L) | Harvest Efficiency | SVI (ml/g) |
|---|---|---|---|---|
| Original sludge | 1809 | 92 | | 50.9 |
| Concentrated Sample #1 | 4703 | 295 | | 62.7 |
| Sample #1 HDS Concentrate | 9224 | 858 | 65% | 93.0 |
| Sample #1 HDS Effluent | 2150 | 100 | | 46.5 |
| Concentrated Sample #2 | 4030 | 233 | | 57.8 |
| Sample #2 HDS Concentrate | 11028 | 840 | 75% | 87.2 |
| Sample #2 HDS Effluent | 1564 | 80 | | 51.2 |

In the foregoing discussion reference has been made to HDS systems. It is to be understood that the HDS systems which may be implemented with the present concepts may be a single stage and/or multiple stage HDS system arrangement. For example, two, three, four or more stages may be used in the HDS system.

Figure 9A:
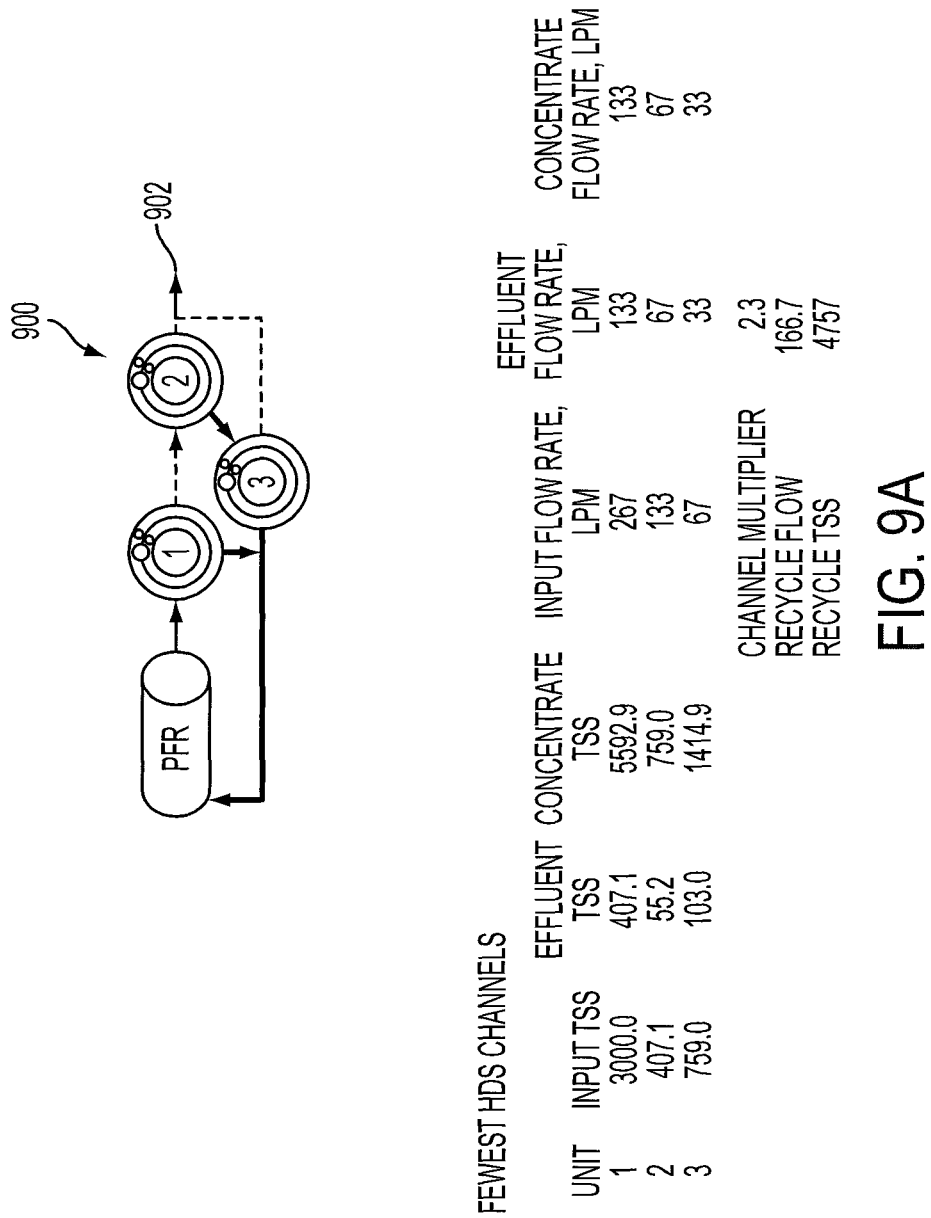
FIGS. 9A-9F depict alternative arrangements of multi-stage hydrodynamic separator (HDS) systems which may be used in conjunction with the concepts of the present application.

Turning to FIGS. 9A-9F a plurality of multi-stage HDS arrangements are illustrated. These figures show the multi-stage HDS systems positioned to receive MLSS from respective bioreactors and outputs which pass the MLSS to clarifiers (not shown). In each of the FIGS. 9A-9F, the heavier, dark lines represent higher concentration MLSS flow, while the lighter and dotted lines represent lower concentration MLSS flow. Therefore, some recycled flow is provided directly back to the bioreactor (e.g., PFR), while other flow is being recycled back to another stage of the multi-stage HDS system. It is understood that each stage of the multi-stage HDS system can by itself be considered a complete single HDS system, which may be a single channel or stack of channels. With particular attention to FIG. 9A, illustrated is a three-stage system 900, wherein the final output of the HDS system 900 is from a combination of stage 2 and stage 3, as indicated by output arrow 902. In the featured description, the primary output is indicated as the output from stage 2, and it has an effluent of 55.2 mg/L TSS (Total Suspended Solids), with a channel multiplier of 2.3.

A channel multiplier is understood to be the number of channels required divided by the number of channels in one stack of a 50:50 flow split HDS at a same output flow. Comparing channel multipliers allows for a comparison of the efficiency of different process configurations; i.e., which configuration has the fewest channels and therefore costs the least. A stack is discussed in connection with FIGS. 16A-16F. A channel multiplier is also discussed in connection with FIGS. 16A-16F. Based on the above definition, if the flow through an HDS system is 100 lpm, and each channel can handle 0.6 lpm, (and therefore each HDS only outputs 0.3 lpm returning 0.3 lpm to the influent), then the total flow through a single stack is 200 lpm, and the total number of channels per stack is 333. This is the denominator in the channel multiplier definition. Therefore in a system with two stacks in series, with each only having an output of 50% of what enters the input, then if 400 lpm enters the first stack, and 200 lpm enters the second stack, this would mean a total of 400 lpm/0.6 lpm/channel+200 lpm/0.6 lpm/channel=1000 channels). The channel multiplier therefore for the two stacks in series is 1000/333=3.

Figure 9B:
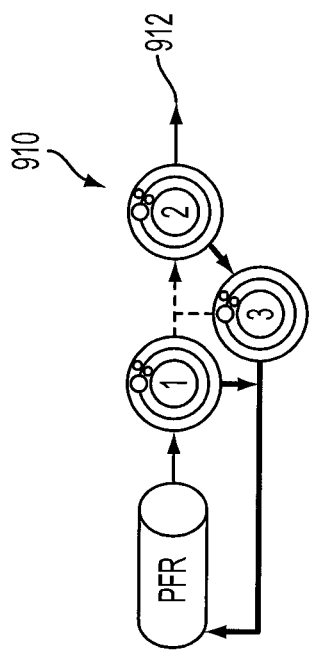

Turning to FIG. 9B, this is a three-stage HDS system 910, wherein the primary output is from stage 2 as shown by output arrow 912. The effluent from stage 2 having 44.2 mg/L TSS, an effluent flow rate of 100 liters per minute (lpm), and the system has a channel multiplier of 3.0.

Figure 9C:
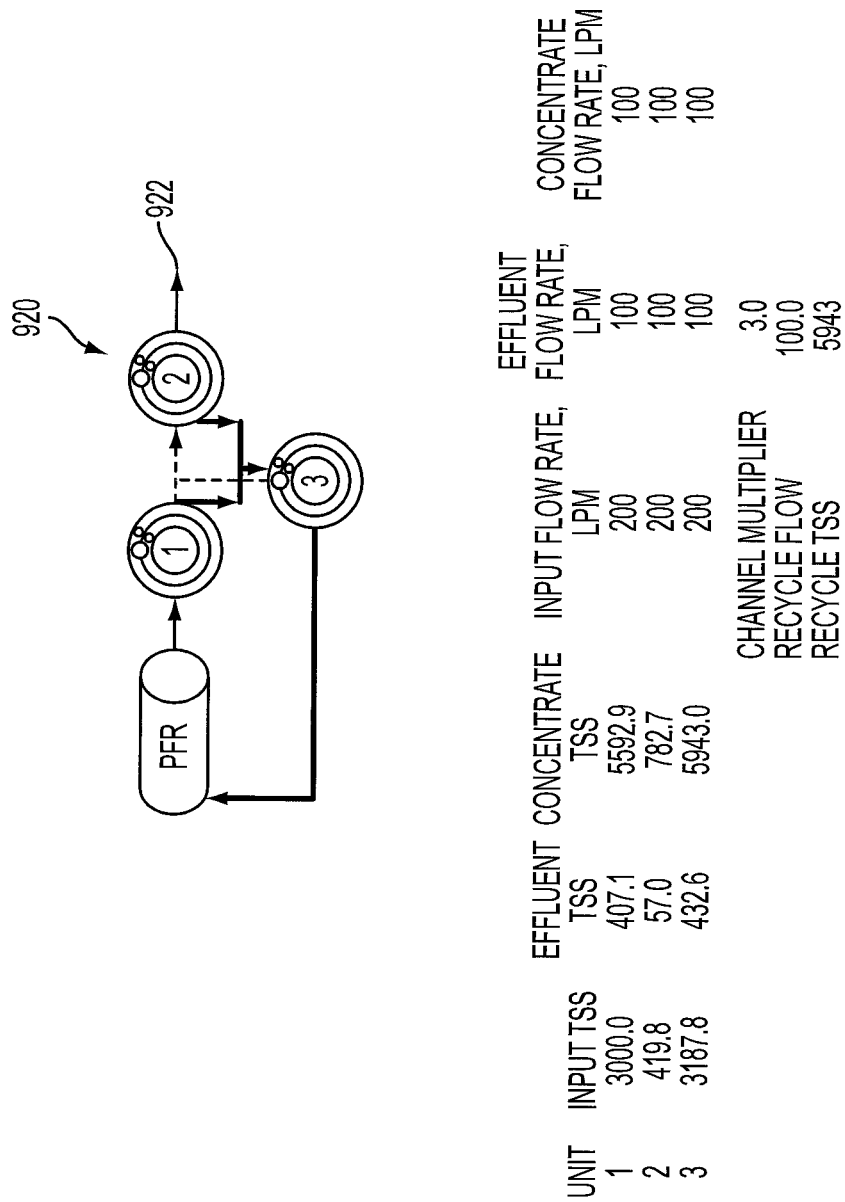

Turning to FIG. 9C, illustrated is a three-stage HDS system 920, whose final output is from stage 2, as noted by output arrow 922. The effluent output from stage 2 having a 57.0 mg/L TSS, at an effluent flow rate of 100 lpm. The system 920 of FIG. 100 is noted to have a channel multiplier of 3.0.

Figure 9D:
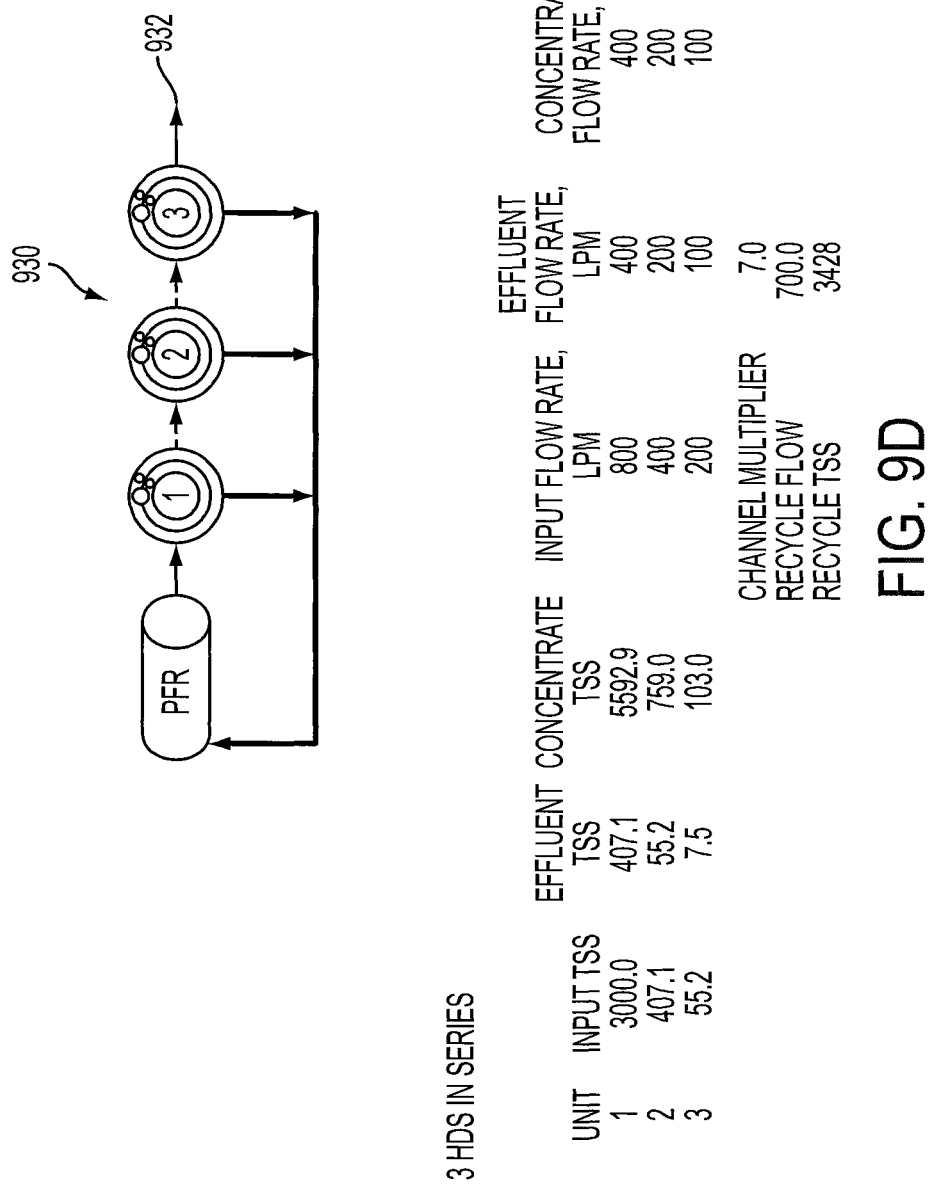

FIG. 9D illustrates a three stage in-series HDS arrangement 930 in which three separate HDS systems are connected in series. The final effluent concentration is output from stage 3 as indicated by output arrow 932. The effluent having 7.5 mg/L TSS and is at a flow rate of 100 liters per minute (lpm). The channel multiplier is 7.0.

Figure 9E:
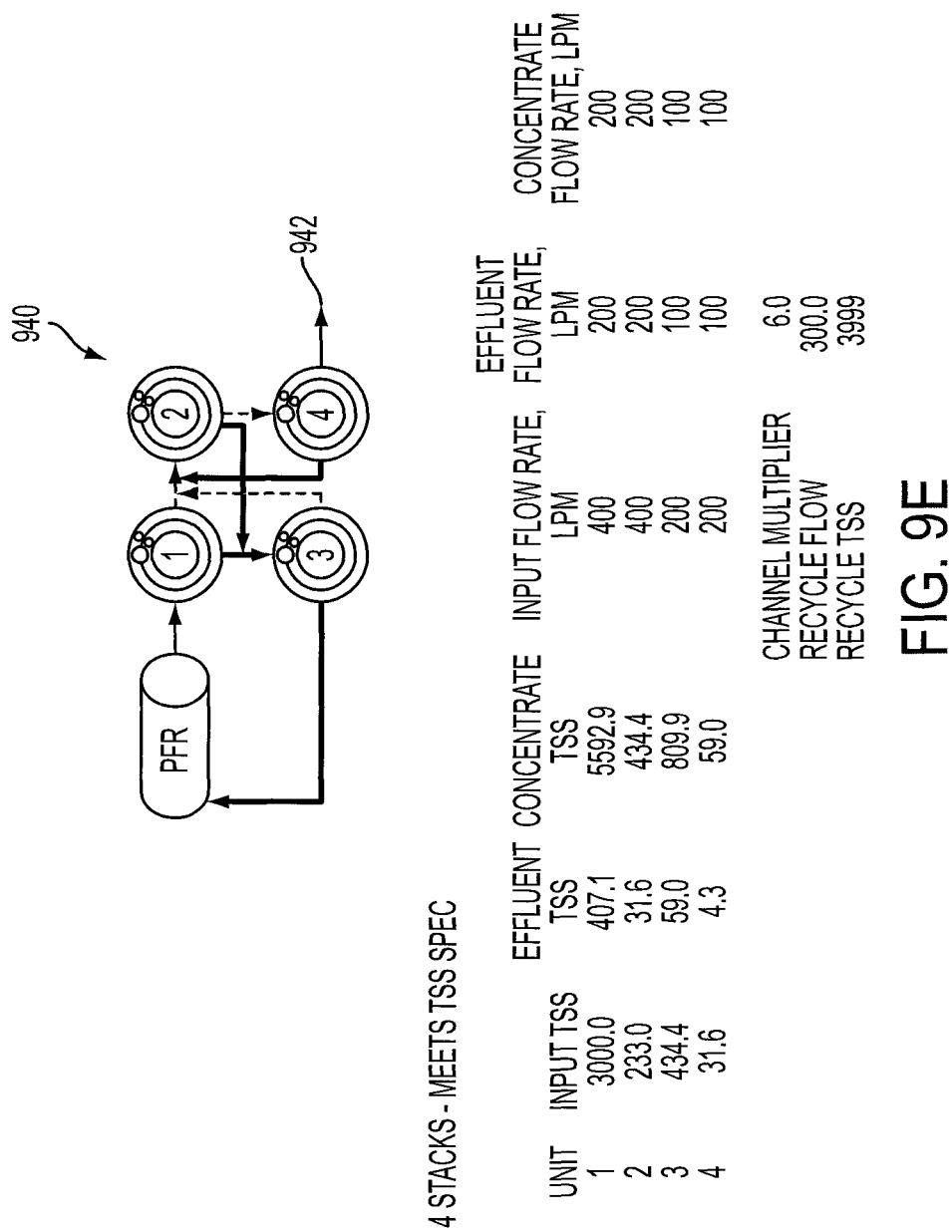

Turning to FIG. 9E, illustrated is a four-stage HDS arrangement 940, where the final output effluent is from stage 4 as indicated by output arrow 942. In this embodiment, the output from stage 4 having 4.3 mg/L TSS, at a flow rate of 100 lpm, and has a channel multiplier of 6.0.

Figure 9F:
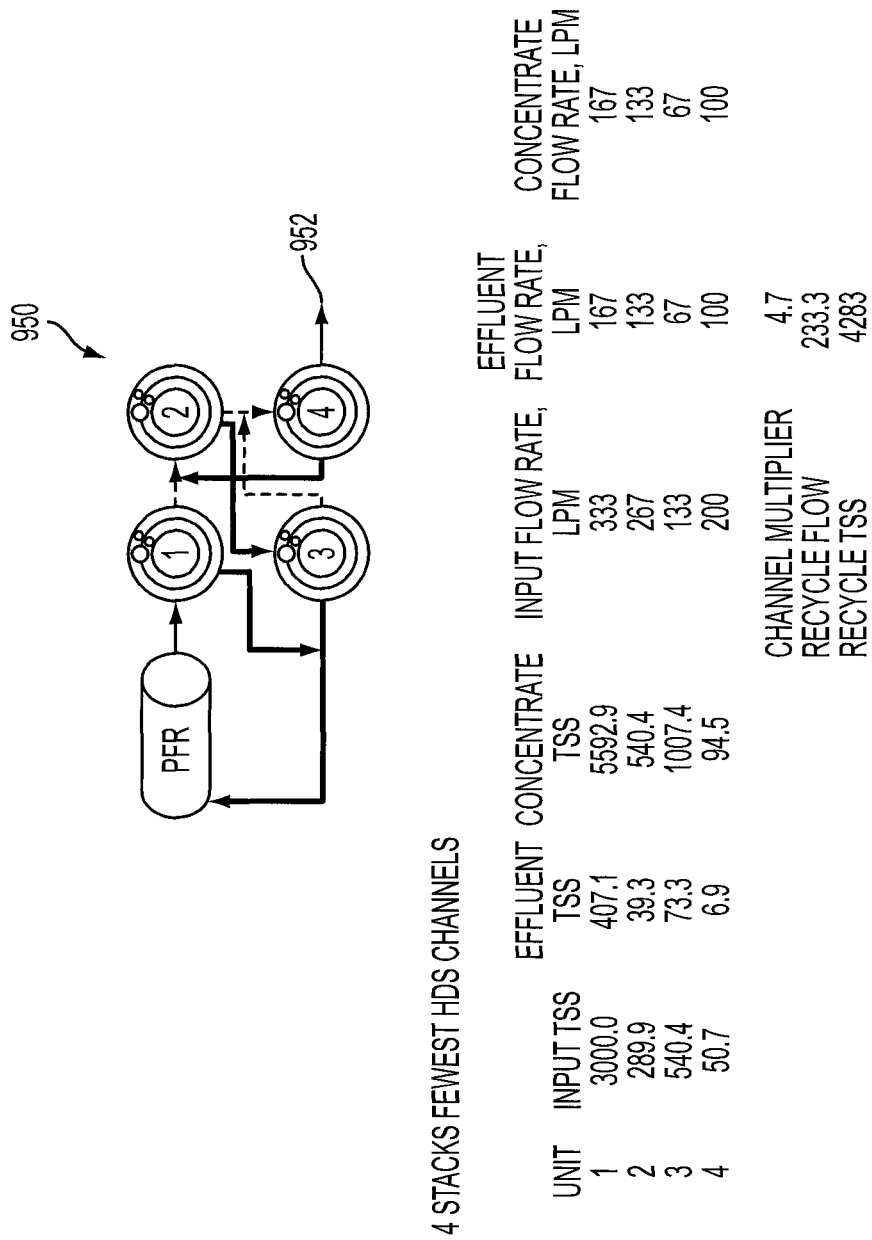

Turning to FIG. 9F, illustrated is another four-stage HDS arrangement 950, where the final output effluent is from stage 4, as indicated by output arrow 952. The effluent having 6.9 mg/L TSS at an output flow rate being equal to 100 lpm, and a channel multiplier of 4.7.

It is noted in the multi-stage HDS arrangements of FIGS. 9A through 9E, 1 ppm of polymer has been projected/added to the MLSS, and each HDS module has a 50:50 output split, with the output flow being equal to 100 lpm. The multi-stage HDS arrangement of FIG. 10F was projected to not have any polymer, and each HDS module has a 54:46 split ratio, with the output flow being equal to 100 lpm.

The described Hydrodynamic Separation (HDS) systems which use curved channels offers advantages in many applications such as disclosed herein, since it is a fast continuous flow technology that can also handle neutrally and near neutrally buoyant particles without the need of a physical barrier or the addition of chemical aids. Commonly the pressure head required to push the liquid through a separation channel of HDS systems is generated through an upfront pump or by gravity trough created by proper arrangement of a source water input.

Figure 10:
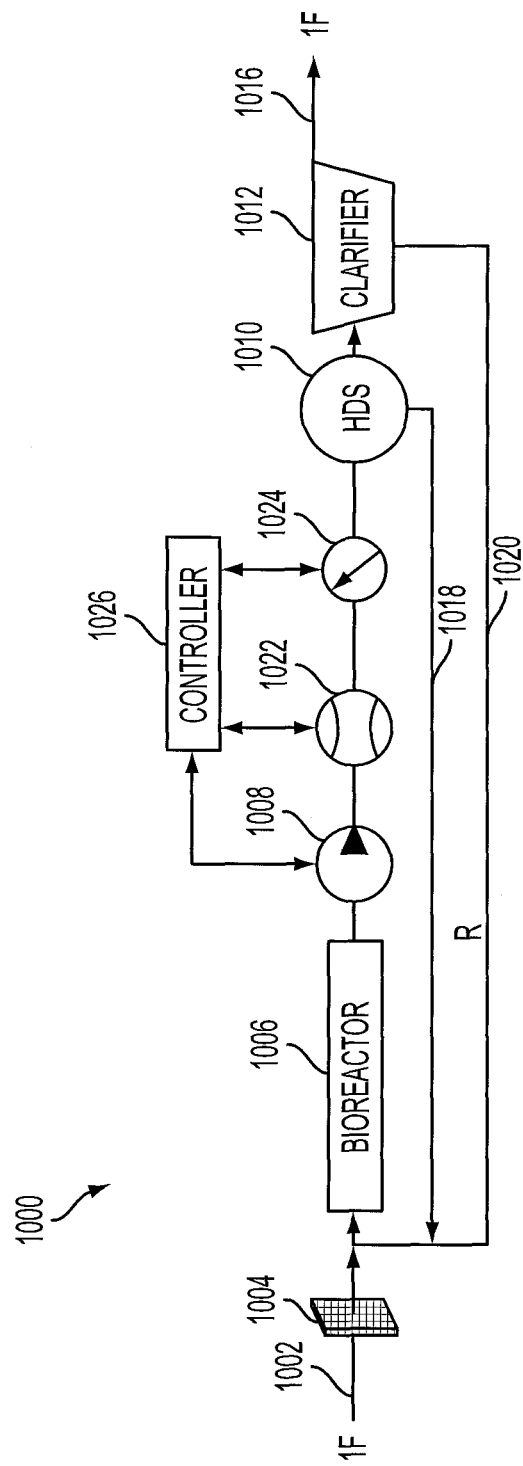
FIG. 10 depicts a push type water processing system wherein a pump is illustrated as being used prior to the HDS system.

Turning to FIG. 10, illustrated is an arrangement of a water processing system (e.g., or ASP) 1000 which uses one embodiment of such push type arrangement. More particularly, a wastewater flow (1F) 1002, is provided to system 1000, past an optional screen filter 1004, to a bioreactor 1006. MLSS from the bioreactor 1006 is passed via a pump 1008 to an HDS system 1010, where separation operations are performed prior to being supplied to clarifier 1012, and thereafter is output as effluent 1016 at a flow rate of 1F. Similar to previous discussions, the HDS system 1010 and the clarifier 1012 each have respective recycle or reflow lines 1018 and 1020, which transfer a portion of the MLSS back to bioreactor 1006. In addition to the above system 1000, is shown to also include a flow meter 1022 and sensor arrangement (e.g., sensors for pressure, temperature, turbidity, bandwidth, viscosity, etc.) 1024. These components, along with pump 1008 are in communication with a controller 1026, where the controller 1026 uses information from the pump 1002, flow meter 1022 and sensor arrangement 1024 to control operation of the pump 1008 as it pushes the MLSS through HDS system 1010.

As shown, pump 1008 is located in front of the HDS system 1002 whereby the MLSS is pushed through the HDS channels. Advantages of this configuration include (1) it is a simple pumping configuration (one pump with associated sensors and controls) and (2) the accessibility of a pressure range exceeding 1 atm (15 psi), which is used to operate HDS channels with small (<20 micron) particle size cut-offs.

MLSS leaving the HDS system 1010 is therefore either being provided to the clarifier 1012 or the recycle line 1018. This split of the MLSS is desired to be maintained at a predetermined ratio (e.g., flow split ratio), depending on the particular implementation and operational parameters (e.g., in one case it may be required to have 70% of the MLSS go to the clarifier and 30% to the recycle line—again this is simply one example and other percentages may be appropriate).

Maintaining a well-defined flow rate split at the end of a separation channel with this type of "push-arrangement" is not trivial, since any fouling/clogging within one of the channel exits can upset this equilibrium, requiring complex pressure control systems. MLSS concentrations, especially enriched from unfiltered raw wastewater, tend to create clogging issues, especially near the channel split. The clogging sometimes is temporary and self-resolving, but in other cases a clogged condition could last for an extended period of time and affect the actual flow split ratio and separation efficiency.

To address the channel clogging issue associated with gravity-driven flow and/or push arrangements such as shown in FIG. 10, the present application also describes a "pull arrangement", where two pumps pull the MLSS in a desired flow split ratio at the channel exits to eliminate potential variability of the flow rate split, while allowing for novel cleaning approaches.

Figure 11:
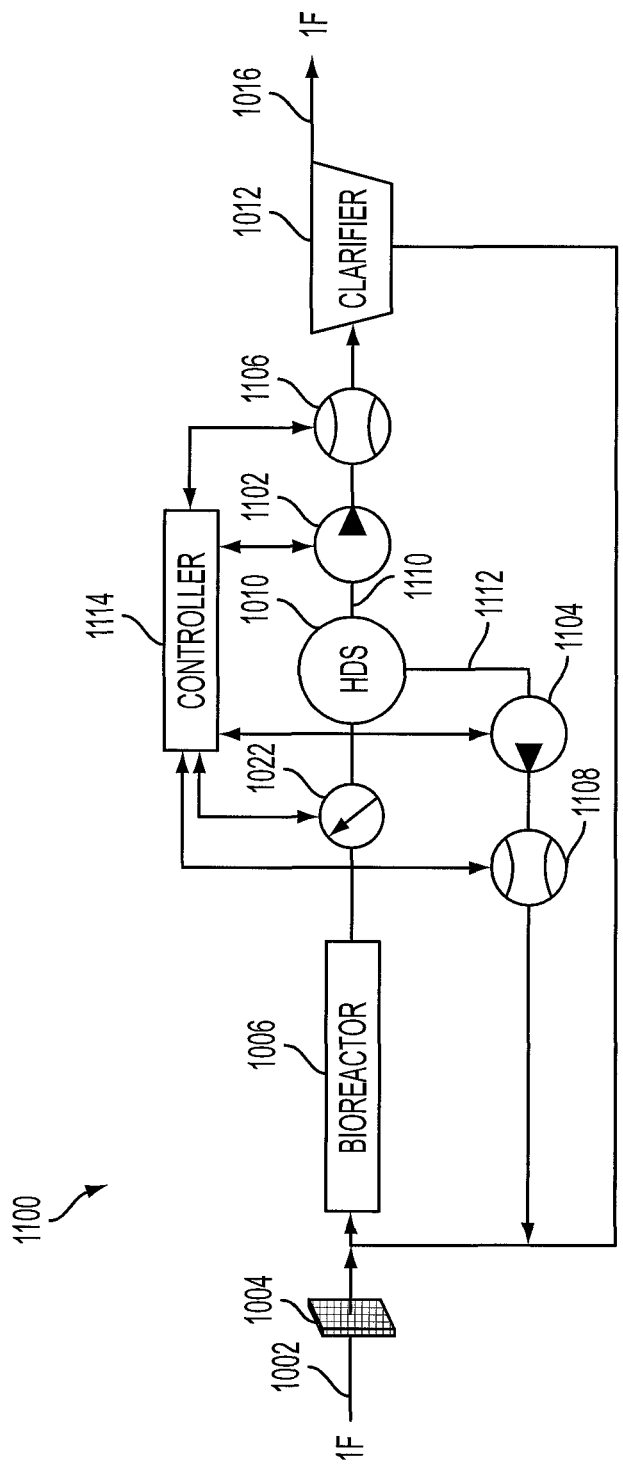
FIG. 11 depicts a pull type water processing system wherein two separate pumps are supplied to the output of the HDS system to move water through the water treatment process.

This alternative (e.g., ASP) embodiment 1100 is illustrated in FIG. 11, where active flow control is provided on the exit streams of the HDS system using pumps 1102 and 1104 (with associated flow meters 1106 and 1108) installed on two exits 1110, 1112 of the HDS system 1010. These pumps 1102, 1104 pull the MLSS through HDS channels, as contrasted with a gravity-head driven push or pump pushed arrangements. This option not only overcomes clogging issues at high MLSS concentrations but also allows flow metering per channel for a precise split ratio, which gives greater flexibility in operation and improved performance. More particularly by having a pump on each output of the HDS system the pump force applied is variable so that each output can have a different applied pump pressure, i.e., the pumps provide two separately controllable flow rates.

In the embodiment of FIG. 11 controller 1114 is configured to obtain information from the pumps 1102, 1104, sensor arrangement 1022, and flow meters 1106, 1108 to generate individualized desired flow rates. Since the MLSS flocs (or other fibrous matter) never see the pumps until exiting the HDS system 1010, even if a shear caused by pumps 1102, 1104 would be sufficient to break up the MLSS flocs (and thus reduces HDS separation efficiency) it is not a concern, as the separation has taken place prior to the flocs entering the pumps. After pumping, MLSS flocs will reform after pumped as they are recycled through bioreactors and/or clarifiers, prior to passing through the HDS system again. Also, unlike in gravity and pump push methods where the fibrous matters that deposit on the sharp flow split (see FIG. 12, where flow split 1202, leads to outputs 1204, 1206, and fibrous material 1208 is shown located at the split 1202) may become stuck, the active pulling mechanism of FIG. 11 helps the HDS system 1010 to recover from this type of partial or temporary clogging by pulling the fibers into one of the two exit channels.

Figure 12:
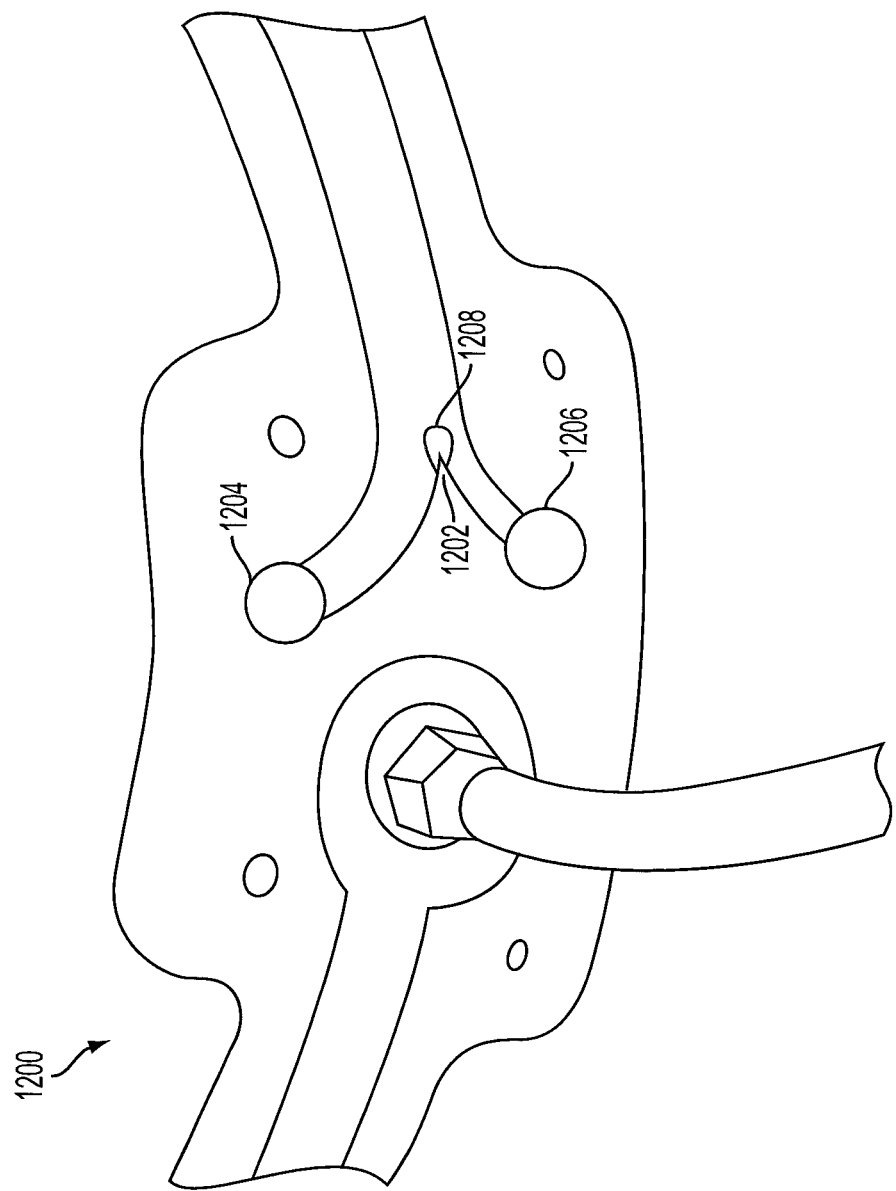
FIG. 12 shows a portion of an HDS system with a floc of particle buildup at the output split of the HDS system.

Among the attributes of the embodiment of FIG. 11 are:
1. Flow split control is actively enforced by the pumps.
2. Fragile MLSS particles that may break up inside a pump are first separated before exposed to the potential high shear stresses, allowing the use of HDS for a wider class of particle types. MLSS flocs will reform after pumped as they are recycled through the system.
3. Reduced clogging is achieved due to consistent pulling of liquid through the exits. FIG. 12 shows a portion of a HDS channel 1200, where a build-up of activated sludge is at the splitter portion 1202 of the two exits 1204, 1206. The amount of build-up stays constant over time and is restricted by the increased shear as the channel cross-section narrows. This is in contrast to channels operated in push-mode, where clogging of one exit prevents the flow going through the channel, hence changing the flow split ratio and enhancing the fouling/clogging trend.
4. Availability of additional cleaning modes, e.g. pumps are configured to operate to flush the exit portions of the hydrodynamic separator system in each direction independently of each other. For example at least one of the pumps can be operated to generate a back flow or back wash of the wastewater in the channels to remove clogs in the channels. More particularly the pump(s) can force flow back into the system by applying a reverse pressure at one or both of the system outlets. Alternatively the pump pressure may be increased in the pulling direction to increase the pressure in the channels above a normal operating pressure to remove clogs in the channels (i.e., operating at least one of the pumps to flush at least one of the exits of the hydrodynamic separator.

These aspects are applicable for HDS channels that have a low pressure drop (<5-10 psi) and which are more prone to failure due to particle build-up in the splitter region. Low-pressure drop channels have been specifically designed to handle large, but fragile particles such as aggregates, floc particles, or any other agglomerates that have been grown (e.g., coagulated or precipitated) under low-shear conditions.

The present pull concepts of FIG. 11 were investigated. Initially wastewater with a MLSS=6,000 mg/L was tested using a 50:50 split ratio HDS floc separator, at two different flow rates, 0.2 L/min and 0.46 L/min (the maximum the employed centrifugal pumps can pull)—so again this discussion is not intended to be limiting to the discussed pumps as pumps of differing sizes may also be employed).

It was determined that at 0.46 L/min, a 2.3× increase in flow rate was achieved over 0.2 L/min design flow. The Recycle Rate was approximately 80% for the 0.46 L/min pump versus 77% for the 0.22 L/min pump, i.e. statistically no different between the two pull rates. The flow ratios were measured with a graduated cylinder, and the results showed the precise flow metering capability of the pull design. It is also considered that the 2.3× flow increase translates into possibly 2.3× fewer HDS channels to process the same amount of liquid, and thus a potential 2.3× reduction in cost of HDS stacks. The output effluent quality at 0.46 L/min flow rate also achieved the target 3,000 mg/L for the clarifier.

Figure 13:
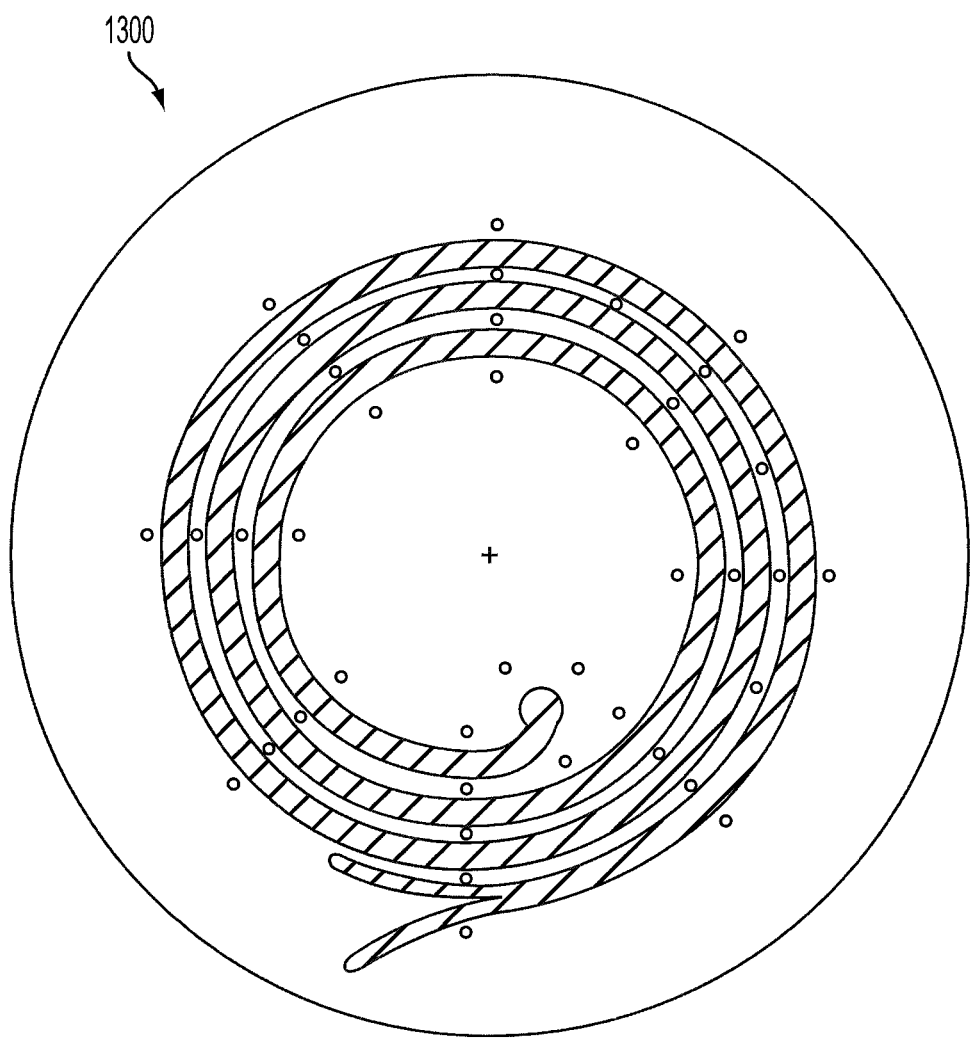
FIGS. 13-15 illustrate alternative channel designs of the HDS system.
Figure 14:
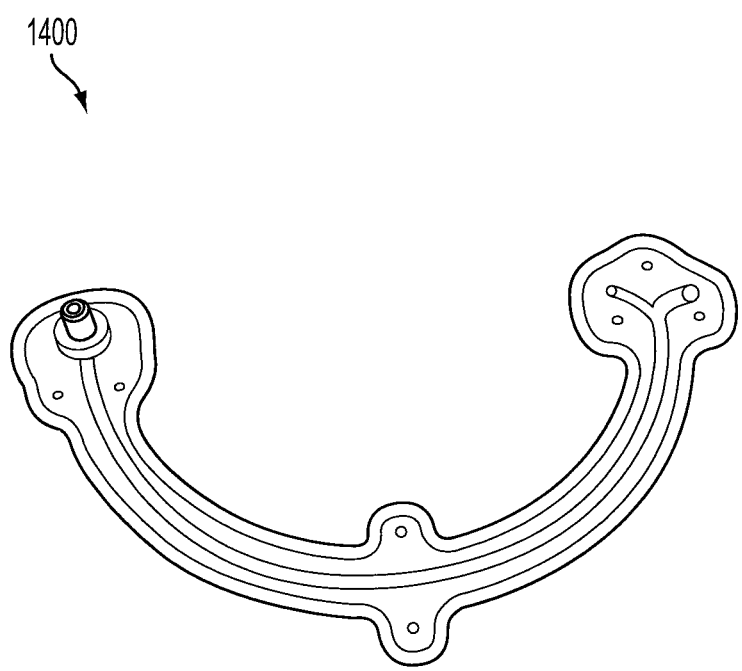
Figure 15:
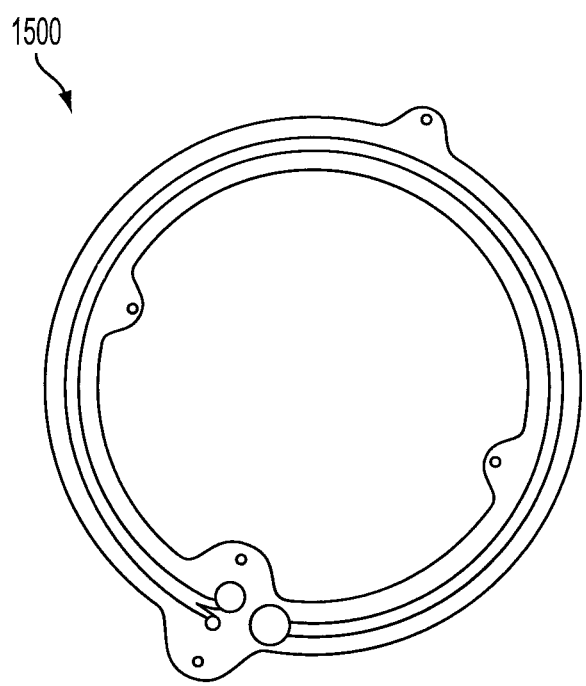

Turning now to FIGS. 13-15, it is to be understood the HDS systems of the present application may employ a variety of curved channels. In this regard, FIGS. 13-15 are provided to illustrate some of those variations of HDS channel design. These include a spiral channel design 1300 shown in FIG. 13, as well as the half turn channel 1400 of FIG. 14 and the full turn channel 1500 of FIG. 15. Again this is not intended to be limiting and other designs such as described in the material incorporated herein by reference are also understood to be applicable.

Figure 16A:
FIGS. 16A-16D illustrate HDS configurations in modular forms and being configured into larger units.

Turning to FIGS. 16A-16D, provided is an illustration depicting how the throughput and separation capacity of the disclosed aspects may be amplified for use in WWTP designs. For example, FIG. 16A represents a single hydrodynamic separator module. This module may for example be a single HDS system or may be configured as a multi-stage HDS system as discussed above.

Figure 16B:
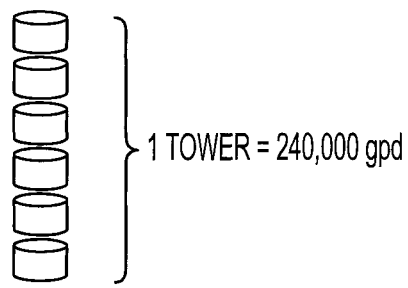
Figure 16C:
Figure 16D:
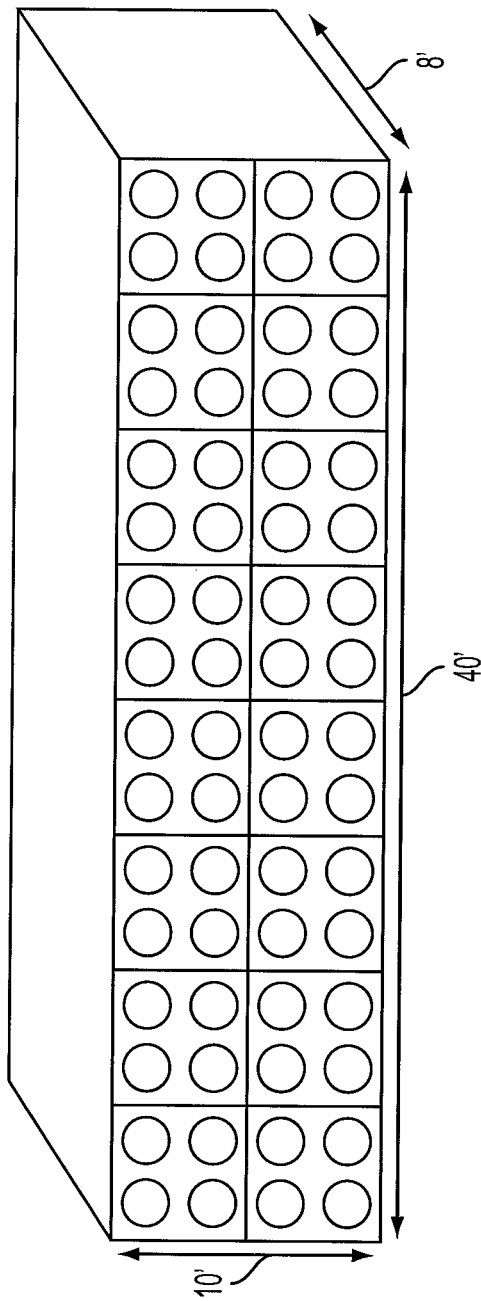

For this discussion it is considered that one such module can treat 40,000 gallons of wastewater per day. A plurality of modules may be stacked in planar relationship, and form a tower such as that depicted in FIG. 16B. In FIG. 16B, the tower includes 6 modules. This is merely exemplary, however, and more or less may be used. Using 6 modules, of the type shown in FIG. 16A, the hydrodynamic separator (HDS) tower may handle, for example, a throughput of 240,000 gallons per day. FIG. 16C contemplates the positioning of 4 towers of the type shown in FIG. 16B within a single, closely packed arrangement, i.e. a 1 MGD hydrodynamic separator unit, for example retained or positioned on a skid or other base support. In such an arrangement, for example, each tower may have a diameter of about 2 feet. Based on this, the skid, having an overall footprint of only 5 feet by 5 feet, has a throughput capacity of 1 million gallons per day (MGD). Finally, FIG. 16D provides a schematic for an assembly including 16 such units or skids, and thus representing a cleaning capacity of 16 MGD. Again, the above values are for discussion purposes and may vary depending upon particular applications.

In addition to separating particles having a certain weight, as previously mentioned, HDS systems are further capable of the separation of substantially neutrally buoyant particles from a liquid (e.g., wastewater) without a barrier and/or the addition of chemicals or other particles. Because of centrifugal forces on the liquid flowing through the channel, transverse flow patterns emerge. Under certain flow condition and geometrical constraints these transverse flow patterns emerge as a pair of Dean vortices. Particles entrained in such a flow are spiraling around these vortex cores as they move along the channel. In certain locations, lift-forces, due to the high shear gradients inside the channel push the particles closer to the vortex centers, causing a dynamic focusing of the particles into a band around the vortex cores.

Figure 17:
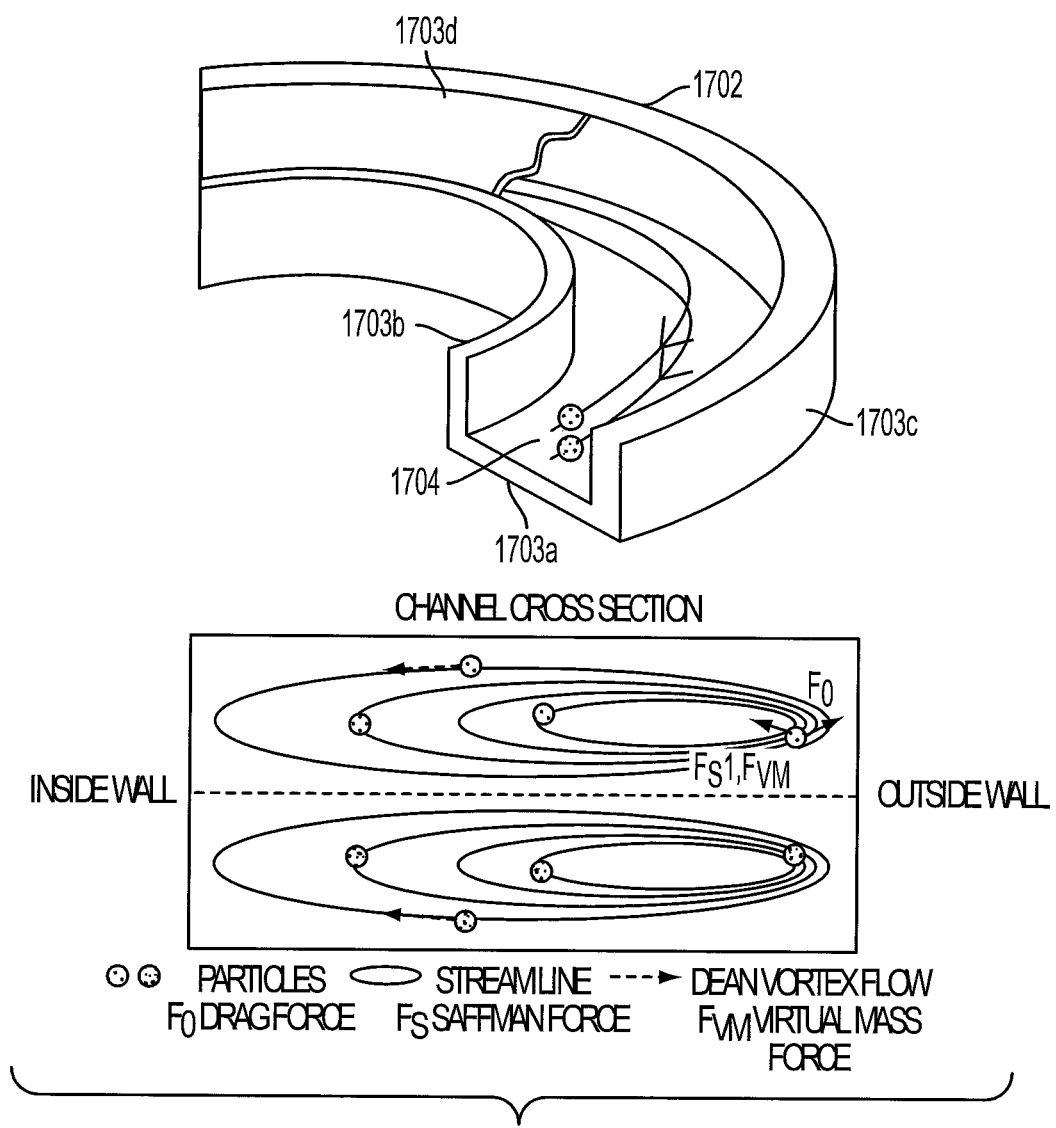
FIG. 17 provides the curved channel portion of one HDS channel system in order to describe mutually buoyant concepts of HDS operations.

Turning now more particularly to the separation concepts of the hydrodynamic separation units in the foregoing discussion, FIG. 17 illustrates a curved channel 1702 which is to be found in such hydrodynamic separation units discussed in the present application, including those illustrated in FIGS. 7, 8, 9A-9F, 10, 11, 13, 14, 15 and 16A-16D, as well as those depicted in the documents incorporated herein by reference. It is to be appreciated that in embodiments of these differently configured separation units, the curved channel includes a bottom wall 1703a, an inner side wall 1703b, an outer side wall 1703c and a top wall 1703d, where a portion of top wall 1703d is shown as removed for discussion purposes. By this design with the top wall 1703d, the fluid passing through the channel 1702 is maintained securely within the channel.

With continuing attention to FIG. 17, it is shown that centrifugal forces acting on the liquid stream introduce a transverse flow pattern, which can manifest as a pair of Dean Vortices. Under the right flow conditions a combination of hydrodynamic forces (drag, shear, inertia) move suspended particles to an equilibrium position near one of the side walls. This separation mechanism is to first order independent of the density of the particles, allowing the concentration of neutrally buoyant particles 1704 (e.g., particles having substantially the same density as water, or the fluid in which the particles reside) flowing in a fluid, e.g. water, to facilitate improved separation of such particles from the fluid into a concentrated mass. All the forces acting on the particles are dependent on the size of the particle, and only particles exceeding a certain cut-off size will be concentrated. The smaller a cut-off size is desired, the higher is the required pressure head. For example, hydrodynamic separator with a 20 micron particle size cut-off can be realized with less than 20 psi pressure head. If the suspended particles that need removal are very small, it is desirable to grow them into larger entities before attempting a hydrodynamic separation.

Depending on the channel geometry and the flow rate the particles are concentrated either at the inner or the outer side wall.

In the foregoing systems of FIGS. 7 and 8, it was explained that the present concepts may be used to expand the capacity of exiting WWTPs treating domestic and/or industrial wastewaters. It is to also be appreciated the concepts of these and the other systems described herein may also be employed in the construction of new WWTPs. In addition, in certain arrangements, the separation capabilities of the described HDS systems may be sufficient to meet the output effluent requirements such that the use of clarifiers are eliminated and the final output of the WWTP described is from the HDS system.

With high MLSS sludge (>3,500 mg/L) environments, appropriate aeration is achieved using a number of different techniques and technologies, including conventional ambient air methods (e.g., fine bubble diffused aeration), and high purity oxygen (HPO) systems, among others.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of operating a wastewater treatment plant employing an activated sludge process (ASP), comprising:
providing wastewater influent, to a system of one or more bioreactors, either in series and/or in parallel, configured to perform activated sludge processing;
processing the wastewater within the one or more bioreactors to develop mixed liquor suspended solids (MLSS);
passing the MLSS in whole or in part from the one or more bioreactors to a hydrodynamic separator system;
performing separation operations on the MLSS within the hydrodynamic separator system, wherein the separation operations generate a low concentration MLSS stream and a high concentration MLSS stream;
passing the low concentration MLSS stream from the hydrodynamic separator system from a first output to a clarifier or clarifiers, and passing the high concentration MLSS stream from a second output back to the one or more bioreactors;
performing clarification operations on the low concentration MLSS stream from the hydrodynamic separator system in the clarifier; and
outputting an effluent flow from the clarifier or clarifiers; and
further including pulling the MLSS through the hydrodynamic separator system using two individual pump pulling actions provided by two separate pumps on two separate outputs of the hydrodynamic separator system.

2. The method according to claim 1 wherein the one or more bioreactors is configured to operate with a mixed liquor suspended solids concentration of approximately 4,500 mg/L or greater.

3. The method according to claim 1 wherein the one or more bioreactors is configured to operate with a mixed liquor suspended solids concentration of approximately 6,000 mg/L or greater.

4. The method according to claim 1 wherein the one or more bioreactors is configured to operate with a mixed liquor suspended solids concentration of approximately between 4,500 mg/L and 6,000 mg/L.

5. The method according to claim 1, further comprising increasing treatment capacity of the ASP wastewater treatment plant by approximately 50% as compared to an identical system not including the hydrodynamic separator, wherein treatment capacity includes at least one of a flow rate or a mass loading rate of the wastewater influent.

6. The method according to claim 1 wherein the pulling actions are configured to provide two separately controllable flow rates, and to provide a MLSS split ratio through each of the first output and the second output.

7. The method according to claim 1 further including operating at least one of the pumps to flush at least one of the exits of the hydrodynamic system in at least one direction.

8. The method according to claim 1 wherein the pulling action prevents a break-up of MLSS flocs prior to processing by the hydrodynamic separator system.

9. The method of claim 1 wherein the wastewater influent is industrial wastewater.

10. A wastewater treatment arrangement comprising:
a bioreactor system having one or more bioreactors, either in series and/or in parallel, configured to perform activated sludge processing to develop mixed liquor suspended solids (MLSS);
a hydrodynamic separator system having an inlet to receive some or all of the MLSS processed by the bioreactor and configured to perform separation operations on the received MLSS, wherein the separation operations generate a low concentration MLSS stream and a high concentration MLSS stream, the hydrodynamic separator system further including a first outlet to pass the low concentration MLSS stream from the hydrodynamic separator system, and a second outlet to return the high concentration MLSS stream to the bioreactor;
an active pull flow control arrangement, including a first pump located at the first outlet of the hydrodynamic separator system and a second pump located at the second outlet of the hydrodynamic separator system; and
a clarifier having an inlet configured to receive the low concentration MLSS stream from the hydrodynamic separator system to perform MLSS separation on the low concentration MLSS stream and the clarifier further configured with an output to output an effluent flow.

11. The wastewater treatment arrangement of claim 10 wherein the bioreactor system is further configured to operate with a mixed liquor suspended solids concentration of approximately 4,500 mg/L or greater.

12. A method of operating a wastewater treatment plant employing an activated sludge process, comprising:
- providing wastewater influent to a bioreactor configured to perform activated sludge processing;
- processing the wastewater within the bioreactor to develop mixed liquor suspended solids (MLSS);
- passing the MLSS in whole or in part from the bioreactor to a hydrodynamic separator system;
- performing separation operations on the MLSS within the hydrodynamic separator system, wherein the separation operations generate a low concentration MLSS stream and a high concentration MLSS stream;
- pulling the MLSS through the hydrodynamic separator by a pump pulling arrangement having a first pump at a first outlet of the hydrodynamic separator system and a second pump at a second outlet of the hydrodynamic separator system;
- passing the low concentration MLSS stream from the hydrodynamic separator system from the first output to a clarifier, and passing the high concentration MLSS stream from the second output back to the bioreactor, wherein the clarifier is configured to perform MLSS separation via settling;
- performing clarification operations on the low concentration MLSS stream from the hydrodynamic separator system in the clarifier; and
- outputting an effluent flow from the clarifier.

13. The method according to claim 12 wherein the wastewater treatment plant is configured to operate at a mixed liquor suspended solids concentration of approximately 5,000 mg/L or greater.

14. The method according to claim 12 wherein the wastewater treatment plant is configured to operate at mixed liquor suspended solids concentration of approximately 6,000 mg/L or greater.

15. The method according to claim 12 wherein the wastewater treatment plant is configured to operate at a mixed liquor suspended solids concentration of approximately between 5,000 mg/L and 6,000 mg/L.

16. The method according to claim 12 wherein the pulling actions are configured to provide two separately controllable flow rates, and to provide a MLSS split ratio through each of the first output and the second output.

17. The method according to claim 12 further including operating at least one of the pumps to flush at least one of the exits of the hydrodynamic system in at least one direction.

18. The method of claim 12 wherein the wastewater influent is industrial wastewater.

* * * * *

UNITED STATES PATENT AND TRADEMARK OFFICE
CERTIFICATE OF CORRECTION

PATENT NO. : 9,758,407 B2
APPLICATION NO. : 14/136461
DATED : September 12, 2017
INVENTOR(S) : Huangpin B. Hsieh et al.

It is certified that error appears in the above-identified patent and that said Letters Patent is hereby corrected as shown below:

Replace:
(54) RECYCLING ACTIVATED SLUDGE BY HYDRODYNAMIC SEPERATOR (HDS) TO ENABLE HIGH MLSS BIOREACTOR TO PROCESS HIGH INFLUENT FLOW AND/OR HIGH STRENGTH WASTEWATER With:
(54) RECYCLING ACTIVATED SLUDGE BY HYDRODYNAMIC SEPARATOR (HDS) TO ENABLE HIGH MLSS BIOREACTOR TO PROCESS HIGH INFLUENT FLOW AND/OR HIGH STRENGTH WASTEWATER Signed and Sealed this
Twelfth Day of December, 2017

Joseph Matal
*Performing the Functions and Duties of the
Under Secretary of Commerce for Intellectual Property and
Director of the United States Patent and Trademark Office*